US006238074B1

(12) United States Patent
Hulse et al.

(10) Patent No.: US 6,238,074 B1
(45) Date of Patent: May 29, 2001

(54) OPTICAL WAVEGUIDE STRUCTURES

(75) Inventors: George R. Hulse; James Burr Anderson, Jr., both of Cookeville, TN (US)

(73) Assignee: Cooper Automotive Products, Inc., Houston, TX (US)

( * ) Notice: Subject to any disclaimer, the term of this patent is extended or adjusted under 35 U.S.C. 154(b) by 0 days.

(21) Appl. No.: 09/109,051

(22) Filed: Jul. 2, 1998

Related U.S. Application Data
(60) Provisional application No. 60/069,118, filed on Dec. 9, 1997.

(51) Int. Cl.[7] ........................................... G02B 5/12
(52) U.S. Cl. ........................ 362/551; 362/31; 362/558; 362/581
(58) Field of Search .............................. 362/31, 551, 558, 362/581

(56) References Cited

U.S. PATENT DOCUMENTS

| | | |
|---|---|---|
| Re. 33,722 | 10/1991 | Scifres et al. . |
| Re. 34,318 | 7/1993 | Davenport et al. . |
| 2,507,909 | 5/1950 | Kaysen . |
| 3,683,167 | 8/1972 | Rishton . |
| 3,832,028 | 8/1974 | Kapron . |
| 3,901,581 | 8/1975 | Thiel . |
| 3,951,139 | 4/1976 | Kloots . |
| 3,962,702 | 6/1976 | Kriege . |
| 4,151,582 | 4/1979 | Grunberger . |
| 4,222,091 | 9/1980 | Bartenbach . |
| 4,282,560 * | 8/1981 | Kringel et al. ........................ 362/26 |
| 4,428,029 | 1/1984 | Baliozian . |
| 4,714,983 | 12/1987 | Lang . |

(List continued on next page.)

FOREIGN PATENT DOCUMENTS 2-113293   4/1990 (JP) .

OTHER PUBLICATIONS

Stuart Birch; "Lighter Moments"; Mar. 1997; Automotive Engineering.
Michael A. Marinelli et al.; "Diode Lasers Light the Way for Automotive Signal Lamps"; Nov. 1997; Photonics Spectra.
James Braham; "Bosch Lights Up: One Bulb, One Reflector, Two Beams"; Dec. 12, 1996; Machine Design.
Henning Hogrefe, et al.; "Improving Safety Through Adaptive Forward Lighting"; Oct. 1997; Automotive Engineering.
George R. Hulse; "Focus–Less Optics and their use in Automotive Distributed Lighting Systems"; Feb. 24–27, 1997, SAE Technical Paper Series.
George R. Hulse, et al.; "Three Specific Design Issues Associated with Automotive Distributed Lighting Systems: Size, Efficiency, and Reliability"; Feb. 26–29, 1996; SAE Technical Paper Series.
George R. Hules, et al.; "Analysis of Waveguide Geometries at Bends and Branches for the Directing of Light"; SAE Technical Paper, 1998.
George R. Hulse, et al.; "HID Driven Focus–less Optics System for Complete Automotive Distributed Lighting Systems"; SAE Technical Paper 980877, 1998.

Primary Examiner—Cassandra Spyrou
Assistant Examiner—Craig Curtis
(74) Attorney, Agent, or Firm—Keising, Ethington, Barnes, Kisselle, Learman & McCulloch, P.C.

(57) ABSTRACT

An optical waveguide structure for distributing light from a light source includes a cylindrical sleeve configured to accommodate and receive light from the light source. The sleeve includes a central axis. A waveguide collar is formed from a solid, planar block of material. The block of material has a central portion configured to accommodate and surround the sleeve. The first and second output arms extend in a plane away from the central portion. The plane is substantially perpendicular to the central axis.

10 Claims, 36 Drawing Sheets

U.S. PATENT DOCUMENTS

| | | |
|---|---|---|
| 4,755,918 | 7/1988 | Pristash et al. . |
| 4,767,172 | 8/1988 | Nichols et al. . |
| 4,824,194 | 4/1989 | Karasawa . |
| 4,883,333 | 11/1989 | Yanez . |
| 4,897,771 | 1/1990 | Parker . |
| 4,945,457 | 7/1990 | Yazdani et al. . |
| 5,042,892 | 8/1991 | Chiu et al. . |
| 5,042,900 | 8/1991 | Parker . |
| 5,053,765 | 10/1991 | Sonehara et al. . |
| 5,058,985 | 10/1991 | Davenport et al. . |
| 5,193,894 | 3/1993 | Lietar et al. . |
| 5,199,091 | 3/1993 | Davenport et al. . |
| 5,257,168 | 10/1993 | Davenport et al. . |
| 5,311,410 | 5/1994 | Hsu et al. . |
| 5,341,445 | 8/1994 | Davenport et al. . |
| 5,343,367 | 8/1994 | Davenport et al. . |
| 5,363,469 | 11/1994 | Elderfield . |
| 5,436,805 | 7/1995 | Hsu et al. . |
| 5,436,806 | 7/1995 | Kato . |
| 5,499,168 | 3/1996 | Cochard et al. . |
| 5,559,911 | 9/1996 | Forkner et al. . |
| 5,560,699 | 10/1996 | Davenport et al. . |
| 5,574,328 | 11/1996 | Okuchi . |
| 5,584,558 | 12/1996 | Nath . |
| 5,613,751 | 3/1997 | Parker et al. . |
| 5,618,096 | 4/1997 | Parker et al. . |
| 5,640,483 | 6/1997 | Lin . |
| 5,664,863 | 9/1997 | Cassarly et al. . |
| 5,675,677 | 10/1997 | Davenport et al. . |
| 5,711,588 | 1/1998 | Rudisill . |
| 5,791,756 | 8/1998 | Hulse et al. . |
| 5,812,714 | 9/1998 | Hulse . |

\* cited by examiner

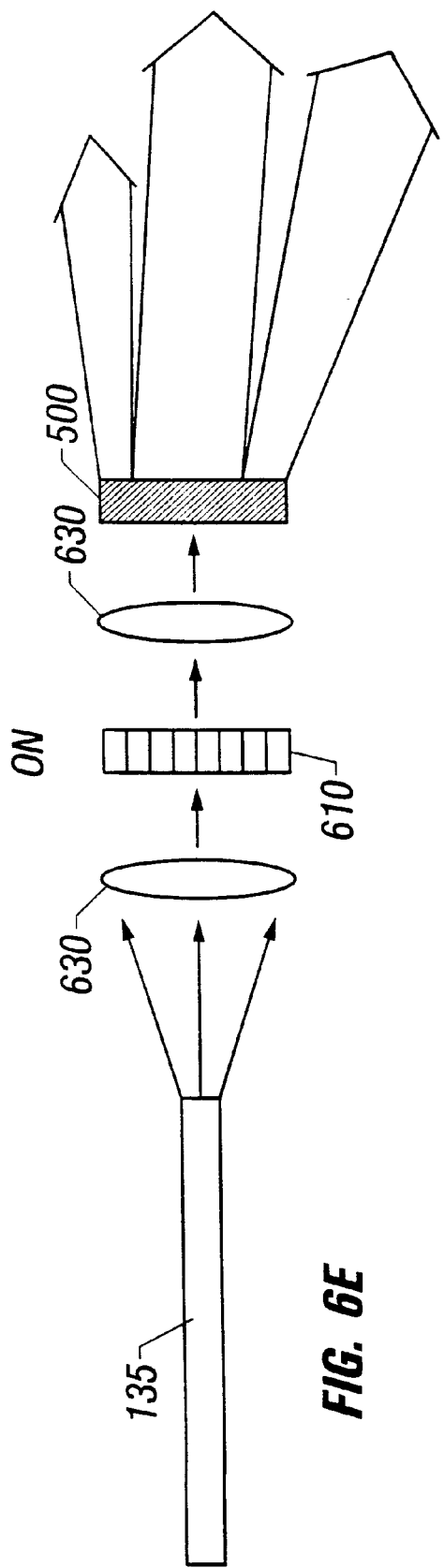
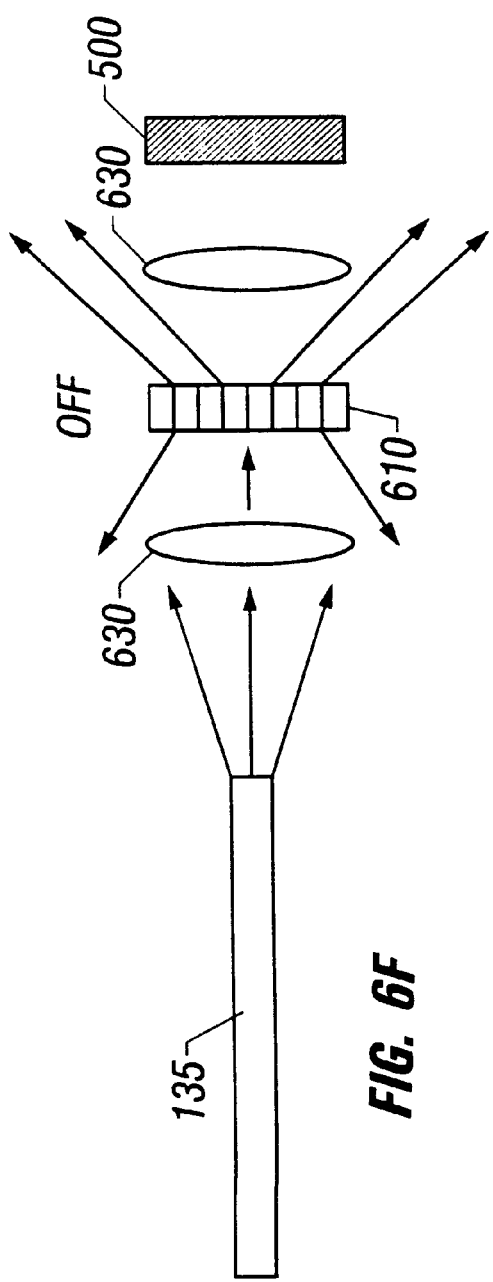
FIG. 6E
FIG. 6F

OPTICAL WAVEGUIDE STRUCTURES

CROSS REFERENCE TO RELATED APPLICATIONS

This application claims priority from Provisional Application No. 60/069,118, "HID DRIVEN FOCUS-LESS OPTICS SYSTEM," filed Dec. 9, 1997 and Application No. 09/009,836, "DISTRIBUTED LIGHTING SYSTEM," filed Jan. 20, 1998, both of which are incorporated by reference.

BACKGROUND

The invention relates to distributed lighting systems.

Distributed lighting systems distribute light from one or more light sources in central or strategic locations to one or more remote locations. A distributed lighting system promises several advantages over conventional lighting techniques, including low power consumption, extended life, heat reduction where the light is emitted, and increased design flexibility.

SUMMARY

The invention provides a distributed lighting system (DLS) for use, for example, in an automobile. Issues associated with incorporating a distributed lighting system into an automobile are discussed by Hulse, Lane, and Woodward in "Three Specific Design Issues Associated with Automotive Distributed Lighting Systems: Size, Efficiency and Reliability," SAE Technical Paper Series, Paper No. 960492, which was presented at the SAE International Congress and Exposition, Detroit, Mich., Feb. 26–29, 1996, and Hulse and Mullican in "Analysis of Waveguide Geometries at Bends and Branches for the Directing of Light," SAE Technical Paper Series, Paper No. 981189, which are incorporated herein by reference.

A practical distributed lighting system for an automobile must address size, efficiency, and reliability issues. To this end, an implementation of the invention employs focus-less optics components, such as collector elements and waveguides. These components are inexpensive to manufacture, since they can be formed from plastic (acrylic, for example) in an injection molding process. In addition, they have high collecting efficiency and are very compact. For example, a collector element may be smaller than one cubic inch (16.4 cubic centimeters). Components that must handle high heat levels (e.g., components are placed in proximity to the light source) may require a ventilation system or may include portions formed from heat resistant materials, such as glass or Pyrex™.

The three most demanding lighting functions in automotive illumination systems are headlamp high beams, headlamp low beams, and stop lights. These functions may be implemented using a centralized light source having waveguide outputs that transmit the light to the appropriate output points on the vehicle (i.e., the headlamps and stop lights) and form beam patterns at each output location. However, inefficiencies in the light distribution components may make such a configuration impractical. One solution to this problem is to form a hybrid lighting subsystem by combining a conventional optical system, such as a headlamp, with components that receive light from the headlamp and transmit the light through waveguides or fiber optics to provide other lighting functions throughout the vehicle.

Four hybrid lighting subsystems, each including a high intensity discharge (HID) source, should provide enough light for an entire automobile. Less efficient systems may require additional HID sources. The HID source acts as a primary light source for a particular lighting function, such as a headlamp. In addition, the HID acts as a light source for other lighting functions throughout the vehicle. Light sources other than a HID source, such as high intensity infrared (HIR), halogen, cartridge bulbs, printed circuit (PC) bulbs, and other gas discharge and incandescent bulbs, may be used. The hybrid subsystem may employ focus-less optics (FLO) to receive and transmit light from the light source. Focus-less optics components include optical waveguides and collector elements, such as are described below and in U.S. application Ser. Nos. 08/697,930 ("Distributed Lighting System", filed Sep. 3, 1996) and 08/791,683 ("Optical Waveguide Elements for a Distributed Lighting System", filed Jan. 30, 1997), both which are incorporated herein by reference. A hybrid tail light subsystem may be used to provide stop lights, turn signals, backup lights, and a center high-mounted stop light (CHMSL).

A vehicle distributed lighting system may include hybrid headlamp subsystems, turn signal subsystems, and hybrid tail light subsystems. The hybrid headlamp subsystems may provide primary forward illumination for the vehicle. The headlamp subsystems may be light sources for other exterior lights, such as front turn signals of the subsystems and side markers, as well as interior lights, such as dashboard lights and dome lights. These other lights may be connected to the headlamp subsystems by optical waveguides. Similarly, the tail light subsystems provide light for rear turn signals and a center high mounted stop light. The subsystems of the DLS are interconnected so that the light source of one subsystem serves as a redundant light source for another subsystem.

The DLS may incorporate different types of optical waveguide structures to distribute light throughout the vehicle, including joints, elements with epoxy coatings, pinched end collector portions, integrated installation snaps, integrated input optics and integrated output lenses. The DLS may also include waveguide structures to provide illumination to portions of the vehicle interior, including cup holders, assist grips, storage pockets step-up boards and running boards.

In one aspect, generally, an optical waveguide structure for distributing light from a light source includes a cylindrical sleeve configured to accommodate and receive light from a light source. The sleeve includes a central axis. A waveguide collar is formed from a solid, planar block of material. The block of material has a central portion configured to accommodate and surround the sleeve. The first and second output arms extend in a plane away from the central portion. The plane is substantially perpendicular to the central axis.

Embodiments may include one or more of the following features. The sleeve may be configured to confine a portion of light from the light source through internal reflection and to transmit the light away from the light source in the direction of the central axis. The sleeve may be longer in the direction of the central axis than a thickness of the central portion in that direction. The sleeve may have rim portions that are positioned to define gaps, the gaps being configured to accommodate locking tabs of a lamp base.

An integral lens portion may be formed at an end of the first arm. The first and second arms may be optical waveguides that are positioned on a surface of the waveguide collar. The waveguides may extend across the surface of the waveguide collar and beyond an edge of the waveguide collar. The first and second arms may be optical waveguides that protrude above a top surface and below a bottom surface of the waveguide collar.

In another aspect, a waveguide collar for distributing light from a light source includes a solid, planar block of material. The block of material has a central portion that accommodates a light source. The central portion surrounds the light source in a plane. First and second output arms extend in the plane away from the central portion. The thickness of the central portion in a direction perpendicular to the plane is less than a thickness of the output arms in the direction perpendicular to the plane.

Embodiments may include one or more of the following features. A cylindrical sleeve may accommodate and receive light from a light source. The sleeve may be positioned within the central portion.

In another aspect, a waveguide collar for distributing light from a light source includes a solid, planar block of material. The block of material has a hub defining an interior portion configured to accommodate a light source. The hub has side surfaces on an exterior portion. Alignment notches are positioned on the side surfaces. The notches are configured to receive an alignment tab of a waveguide. Rim portions extend around the interior portion of the hub. The rim portions are positioned to define gaps that accommodate locking tabs of a lamp base.

In another aspect, a waveguide collar for distributing light from a light source includes a solid, planar block of material. The block of material has a central portion that accommodates a light source. The central portion surrounds the light source in a plane. First and second output arms extend in a plane away from the central portion. The sides of the first and second output arms curve inward toward the central portion to form first and second vertices where the first and second arms meet. A lens is formed on an edge of the waveguide collar. The lens receives light from the light source, focuses a portion of the light, and transmits the portion of the light away from the collar.

In another aspect, an optical waveguide includes first and second pieces of solid material. The first piece has a transmission portion having a rectangular cross-section and an end that is convex in one dimension. The second piece has a transmission portion having a rectangular cross-section and an end that is concave in one dimension. The end of the first piece and the end of the second piece form an interface between the first piece and the second piece.

Embodiments may include one or more of the following features. A third piece of solid material may have a transmission portion having a rectangular cross-section and an end that is concave in one dimension. The end of the third piece and the end of the first piece may form an interface between the third piece and the first piece. A band may hold the first, second and third pieces together.

A third piece of solid material may have a transmission portion having a rectangular cross-section and an end that is convex in one dimension. The end of the third piece and the end of the second piece may form an interface between the third piece and the second piece. A band may hold the first, second and third pieces together.

In another aspect, an optical waveguide for accepting light from a light source and transmitting the light includes a piece of solid material having an input face, a transmission portion, and an end portion between the input face and the transmission portion. A cross-sectional area of the end portion gradually decreases from the transmission portion to the input face.

Embodiments may include one or more of the following features. The end portion may have planar sides angled from a longitudinal axis of the transmission portion. The angle formed between the sides and the longitudinal axis may be about 5°. The end portion may increase an acceptance angle of the waveguide. A lens portion may be formed on the input face.

In another aspect, an optical waveguide has integrated installation elements. The waveguide includes first and second sections. The first section includes an input face, an output end and a transmission portion extending from the input face to the output end. A key positioned on the output end mates with a socket of the second section. The second section includes an input face, an output end and a transmission portion extending from the input face to the output end. A socket positioned on the output end mates with a key of the first section.

Embodiments may include one or more of the following features. A snap positioned on the transmission portion of the first or second section may mate with an installation fitting of a vehicle. An outer surface of the waveguide may be covered with epoxy.

In another aspect, an optical waveguide includes first and second sections. The first section includes an input face, an output end and a transmission portion extending from the input face to the output end. A claw positioned on the output end mates with a detent of the second section. The second section includes an input face, an output end and a transmission portion extending from the input face to the output end. A detent positioned near the output end mates with the claw of the first section.

In another aspect, an optical waveguide has an output element for providing illumination in a vehicle. The waveguide includes an input face and a transmission portion extending from the input face. The transmission portion widens at an end to form an output element having a convex lens at the end. The output element may be formed to leave an air gap between the lens and the end of the transmission portion.

Other features and advantages will be apparent from the following detailed description, including the drawings, and from the claims.

BRIEF DESCRIPTION OF THE DRAWINGS

FIGS. 6A–6F show waveguide outputs modulated with electromechanical or liquid crystal light valves.

DESCRIPTION

Figure 1:
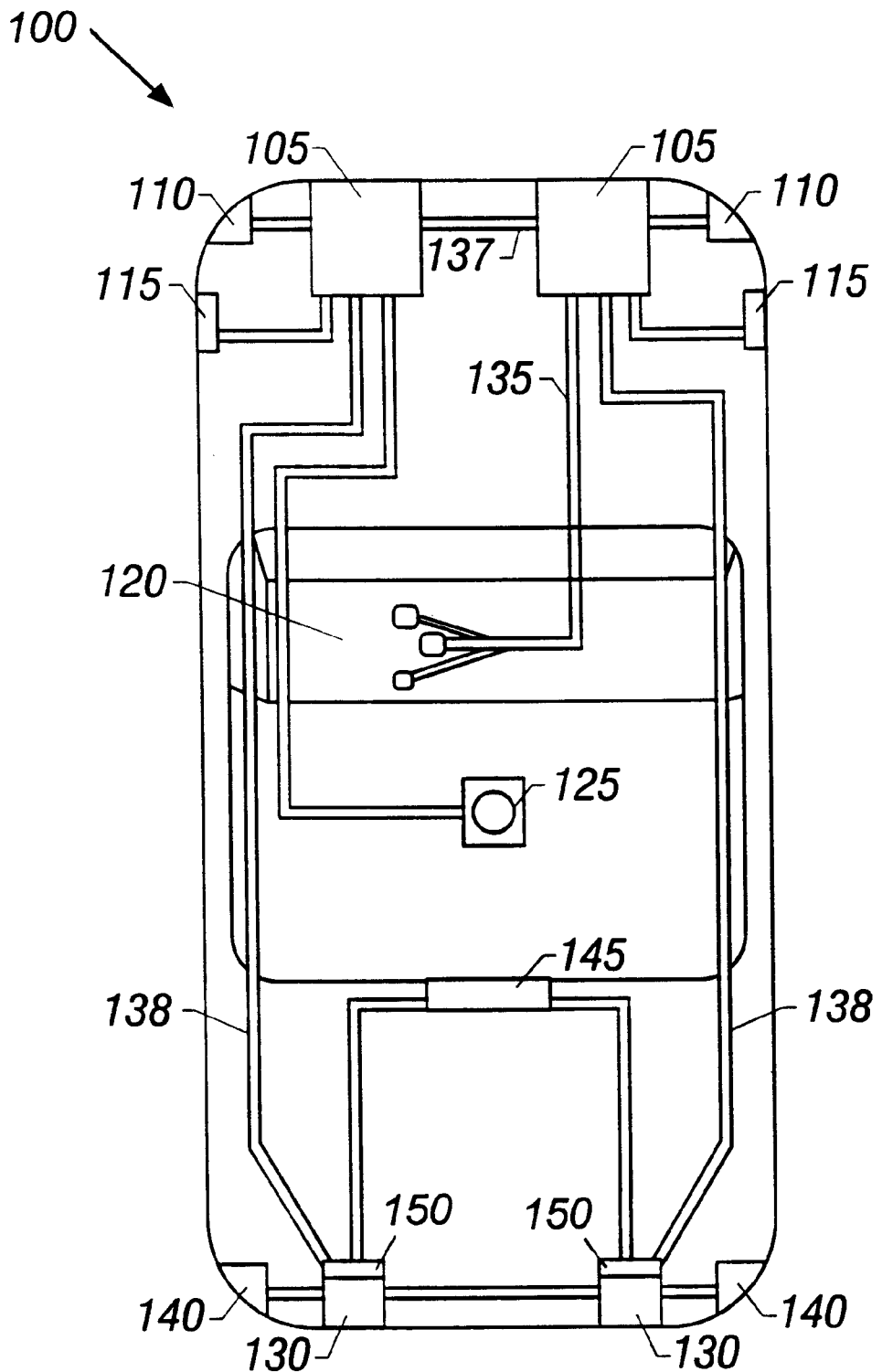
FIG. 1 is a block diagram of a vehicle distributed lighting system with hybrid lighting subsystems.

Referring to FIG. 1, a vehicle distributed lighting system (DLS) 100 includes hybrid headlamp subsystems 105, turn signal subsystems 110 and 140, and hybrid tail light subsystems 130. The hybrid headlamp subsystems 105 provide primary forward illumination for the vehicle. The headlamp subsystems 105 are also light sources for other exterior lights, such as front turn signals of the subsystems 110 and side markers 115, as well as interior lights, such as dashboard lights 120 and dome lights 125. These other lights are connected to the headlamp subsystems by optical waveguides 135 or optical fibers. Similarly, the tail light subsystems 130 provide light for rear turn signals 140 and a center high mounted stop light (CHMSL) 145. The subsystems of the DLS are interconnected so that the light source of one subsystem serves as a redundant light source for another subsystem.

The DLS incorporates different types of optical waveguide structures to distribute light throughout the vehicle. These include joints, elements with epoxy coatings, pinched end collector portions, integrated installation snaps, integrated input optics and integrated output lenses. The DLS also includes waveguide structures to provide illumination to portions of the vehicle interior, including cup holders, assist grips, and storage pockets.

Figure 2:
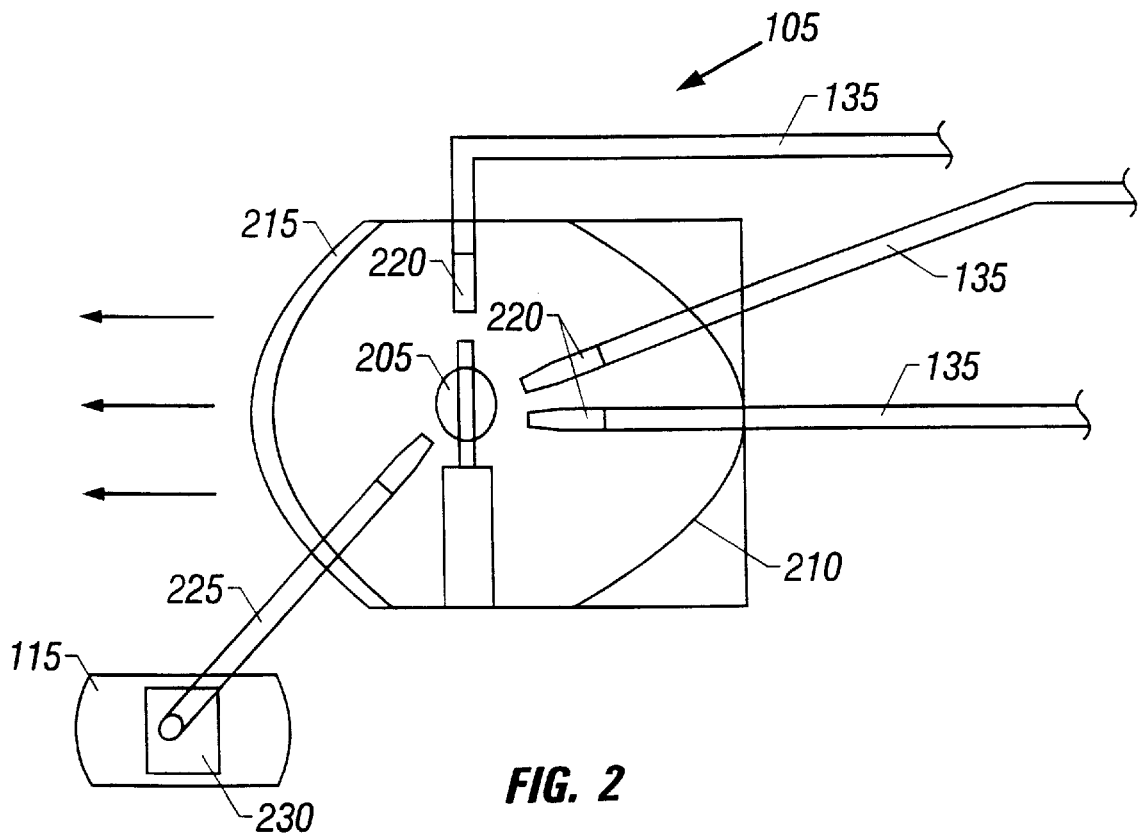
FIG. 2 shows a hybrid headlamp subsystem.

FIG. 2 illustrates a hybrid headlamp subsystem 105. The subsystem includes a light source 205 that may be implemented using, for example, a high-intensity discharge (HID) lamp. Light produced by the light source 205 is collected by a reflector 210 and directed through a lens 215 to provide the primary forward illumination for the vehicle. The reflector may be implemented as a parabolic or complex reflector.

Figure 3:
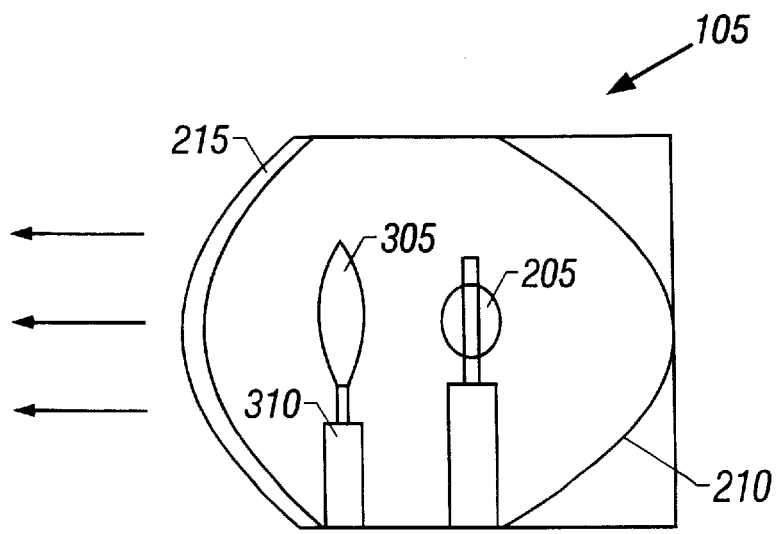
FIG. 3 shows a hybrid headlamp subsystem with a movable lens.

The hybrid headlamp subsystem 105 provides both high beam and low beam illumination. To this end, the subsystem may employ a number of different beam forming techniques, as shown in FIGS. 3–5. For example, FIG. 3 shows a simple Fresnel lens 305 that is moved by an actuator 310 between a high beam position and a low beam position. The movement of the lens 305 shifts the position of the "hot spot" (i.e., the area of most concentrated light) of the headlamp beam in the far field between the appropriate positions for the high and low beams. Other portions of the beam also will shift as the lens 305 moves. In addition to the lens shown, additional lenses or other optical elements (such as wedges) may be used to control the beam pattern.

Figure 4A:
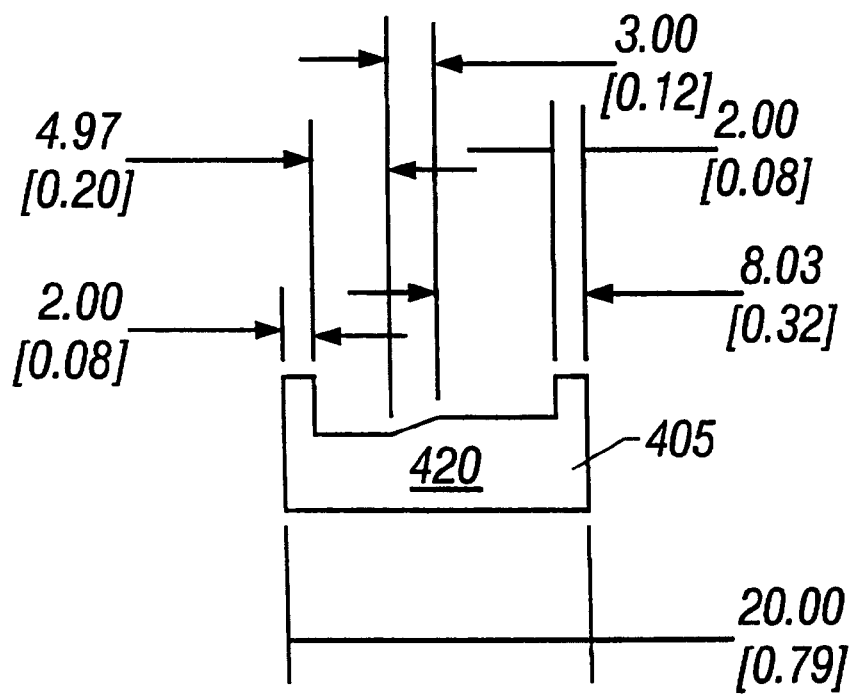
FIGS. 4A–4D show headlamp beam forming structures.
Figure 4B:
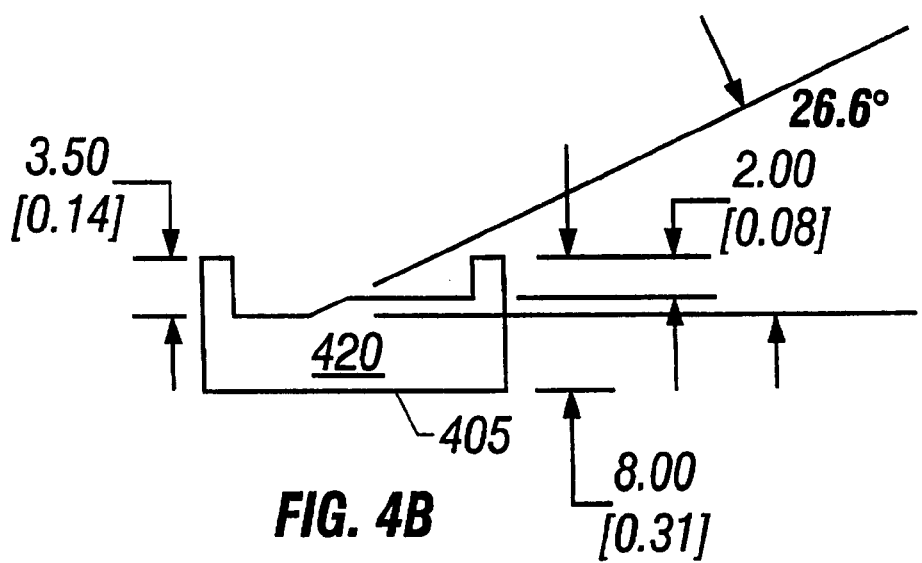
Figure 4C:
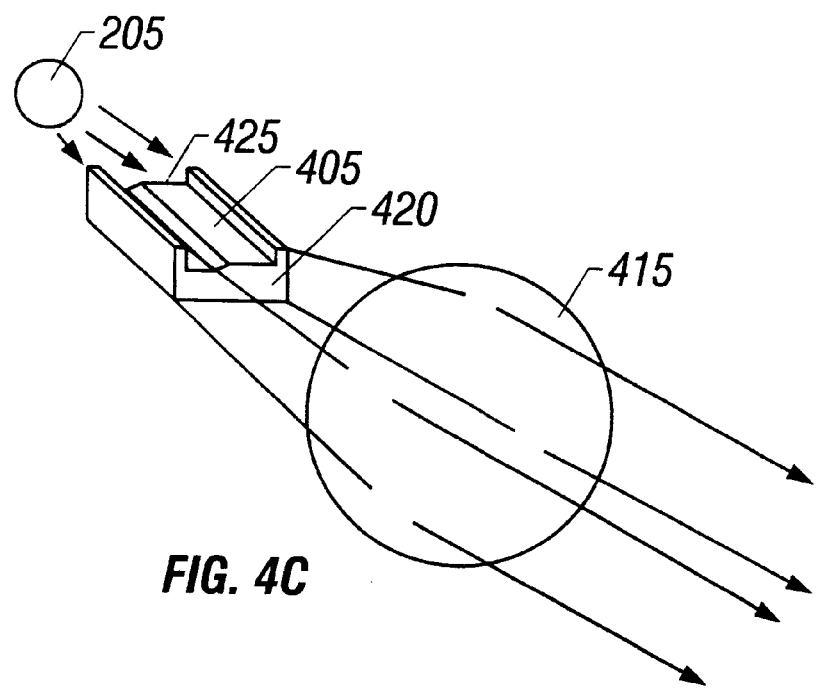
Figure 4D:
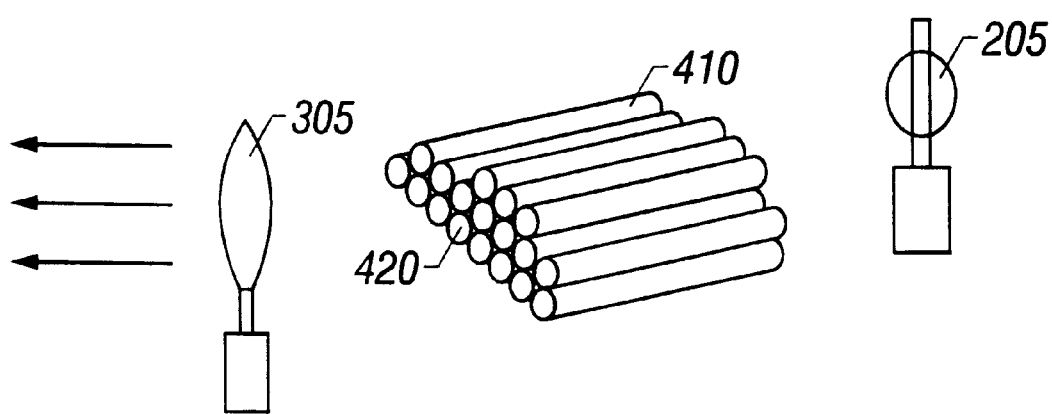
Figure 5:
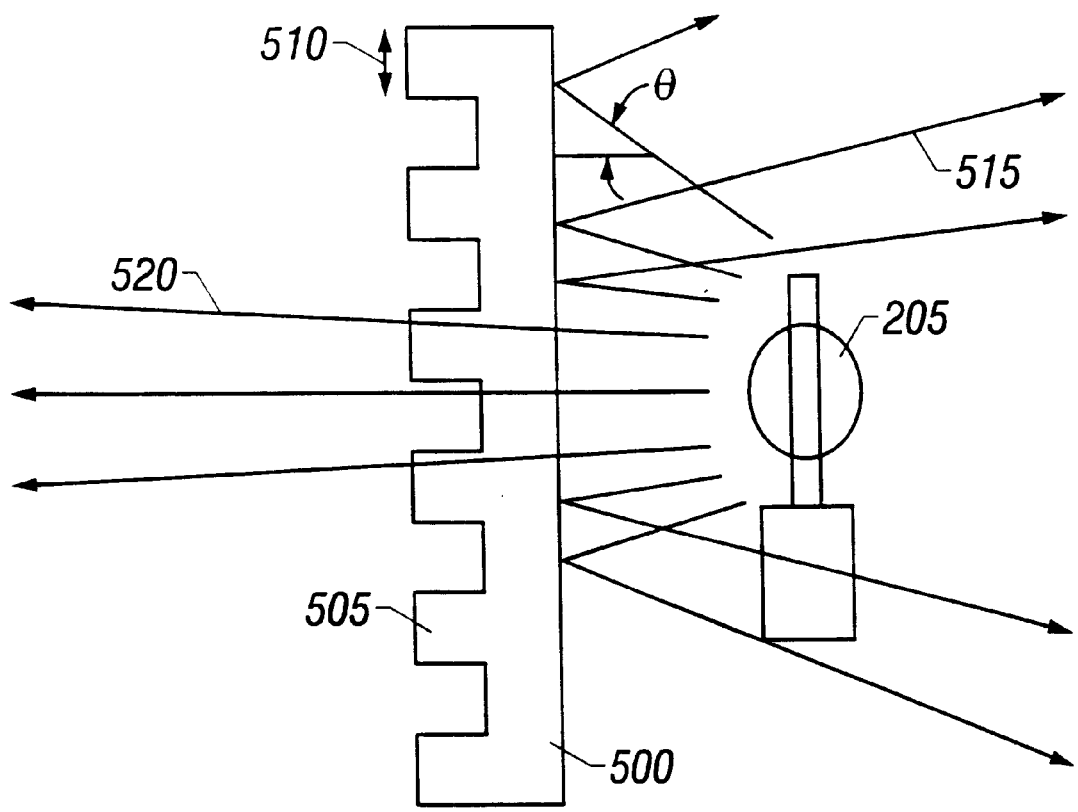
FIG. 5 shows a light source with a diffusion grating.

FIGS. 4A–4D show the use of a solid molded plastic form 405 (FIGS. 4A–4C) or a bundle of plastic or glass fibers 410 (FIG. 4D) to generate a desired headlamp beam pattern. Light from light source 205 passes through the form 405 or bundles 410 and then passes through a focusing lens 415. The shape of the output end 420 of the solid form or bundles, in conjunction with the properties of the focusing lens, determines the beam pattern in the far field. To increase light collection efficiency, the shape of the input end 425 of the solid form may be configured to act as a collector element to receive light from a light source. A reflector 215 may also be used to control the beam pattern, as in FIGS. 2 and 3. FIGS. 4A–4C show dimensions in mm [inches] of a thickness profile that might be used to achieve a desired beam pattern. Similarly, the bundle of fibers can be formed into a desired profile. The input or output ends of the fibers may be fused together. As with the implementation shown in FIG. 3, the lens 305 may be moved to shift the hot spot of the beam between high beam and low beam positions. In addition, a reflector may be used, as shown in FIG. 4D, to help form the desired beam pattern.

FIG. 5 shows the use of a diffraction grating 500 to control the headlamp beam pattern (the diffraction grating may also be used for other lighting functions, such as stop lights and turn signals). The diffraction grating 500 includes essentially transparent material that has a series of ridges 505 on its surface. The width 510 of the ridges is approximately equal to the wavelength of the light produced by the light source 205. A portion 515 of the light passing through the diffraction grating 500 is reflected back toward the light source, with the size of the portion depending upon the exit angle (θ) of the light ray. Some of the light 520 travelling in a direction close to perpendicular (θ=0°) passes through the grating undisturbed. By limiting the exit angle (θ) of the headlamp illumination, the grating 500 may provide, for example, a more focused headlamp beam in the far field. The grating 500 may be used alone or in conjunction with lenses 305, solid forms 405 or fiber bundles 410 described above to provide a desired headlamp beam pattern.

In addition to providing the primary forward illumination, the light source 205 acts as a light source for other parts of the system. As shown in FIG. 2, waveguides 135 having collector elements 220 at their ends are positioned close to the light source 205 to receive light and transmit the light to other locations in the vehicle, such as to provide turn signals, interior lighting, fog lights, and side markers. The waveguides 135 may also carry light to other lighting subsystems to provide redundancy, such as the opposite side headlamp or the tail lights. The number of collector elements 220 may be increased as necessary to supply light for other lighting functions. The collector elements 220 may be glass rods (such as Pyrex) with ends that are polished so as to be faceted or pinched. The pinched ends increase the acceptance angle of the collector element.

FIG. 2. shows a waveguide 225 that carries light from the source to a side marker light 115. The waveguide 225 may include colored plastic filters 230 to provide a desired output color (e.g., amber) for the side marker 115. This configuration eliminates the need for an electrical connection and light bulb in the side marker 115.

Another waveguide provides light to the turn signal subsystem 110. Alternatively, the turn signal subsystem 110 may include an independent light source and may use the input from the headlamp subsystem 105 for redundancy.

As shown in FIGS. 6A–6D, some implementations of the turn signal subsystem use an electromechanical shutter 605 (FIGS. 6A and 6B) while others use a liquid crystal light valve (LCLV) 610 (FIGS. 6C and 6D) to modulate the light produced by the turn signal. A plastic colored filter provides amber color for the turn signal. The use of a colored filter eliminates the need for light bulbs enclosed in cadmium-doped glass.

Figure 6A:
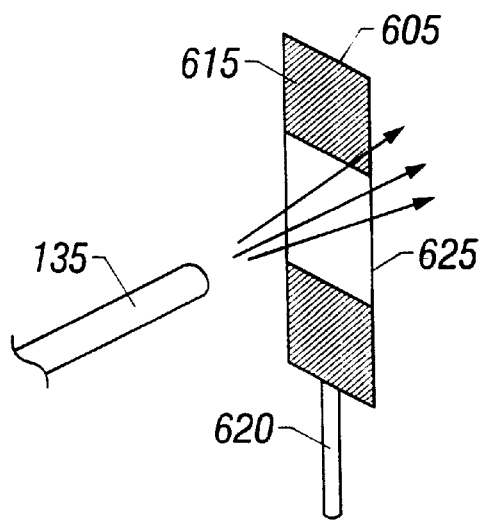
Figure 6B:
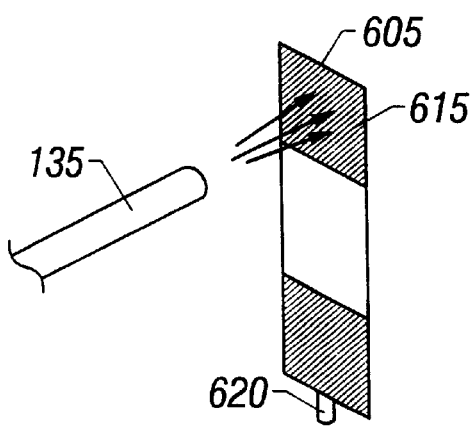

The electromechanical modulator 605, as shown in FIGS. 6A and 6B, includes an opaque shutter 615 that is moved between an ON (FIG. 6A) and OFF (FIG. 6B) position by a solenoid 620. In the ON position, the shutter 615 is moved away from the illumination path, so that essentially all of the light is transmitted. In the OFF position, the shutter 615 blocks the illumination path so that no light is transmitted. The use of an electromechanical modulator 605 with an amber-colored plastic filter provides a desirable aesthetic effect (i.e., the turn signal appears amber when ON but has no color when OFF).

Figure 6C:
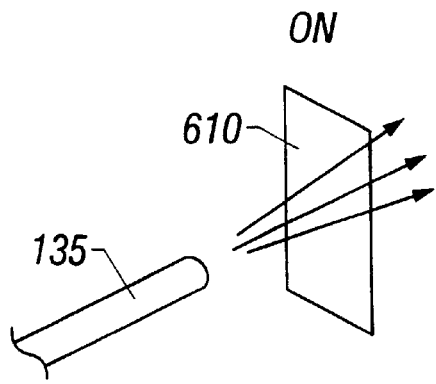
Figure 6D:
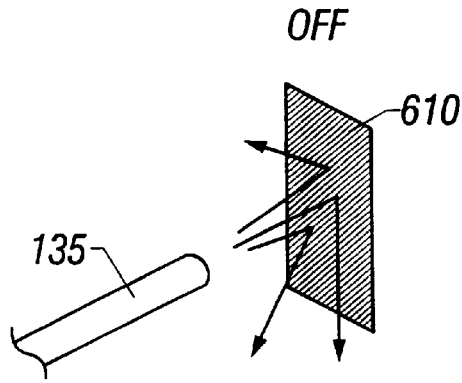

The LCLV illustrated in FIGS. 6C and 6D has no mechanical components. This increases the reliability of the LCLV relating to systems that include mechanical components. The LCLV 610 has two states. In the OFF state (FIG. 6D) the LCLV 610 reflects or scatters most of incident light. In the ON state (FIG. 6C) the LCLV 610 becomes largely transparent (i.e., greater than 80% of incident light passes through the LCLV). The ratio of the light transmitted in the ON state relative to the light transmitted in the OFF state (i.e., the contrast ratio) is approximately 5:1, which meets SAE requirements for a turn signal. A contrast ratio of 5:1 also meets the SAE requirements for stop lights used as turn signals. An infrared reflecting mirror (not shown) may be used to shield the LCLV from infrared energy from the source, thereby increasing the expected life of the LCLV.

As shown in FIGS. 6E and 6F, LCLV modulators 610 may be combined with diffraction gratings 500 to improve the contrast ratio and achieve a desired beam pattern. As discussed above, light from the light source (waveguide 135) is scattered when the LCLV is OFF (FIG. 6F). The diffraction grating 500 lessens the amount of forward scattered light that is emitted. Focusing optics, such as lenses 630, may also be used to provide further beam pattern control.

Referring again to FIG. 1, waveguides or optical fibers also may carry light from the headlamp subsystem to other subsystems that have their own light sources, such as the opposite headlamp subsystem (waveguide 137) or the corresponding tail light subsystem (waveguide 138), to provide light source redundancy. When redundancy is employed and, for example, one of the headlamps fails, light from the operational headlamp will dimly illuminate the failed headlamp. This is safer for the operator of the vehicle than having only one operational headlamp. Redundancy also may be used to reduce the effects of failure of other lighting components. For example, an incandescent PC bulb may be used as a source for trunk lighting and may be connected to provide redundancy to interior reading lights.

Figure 7:
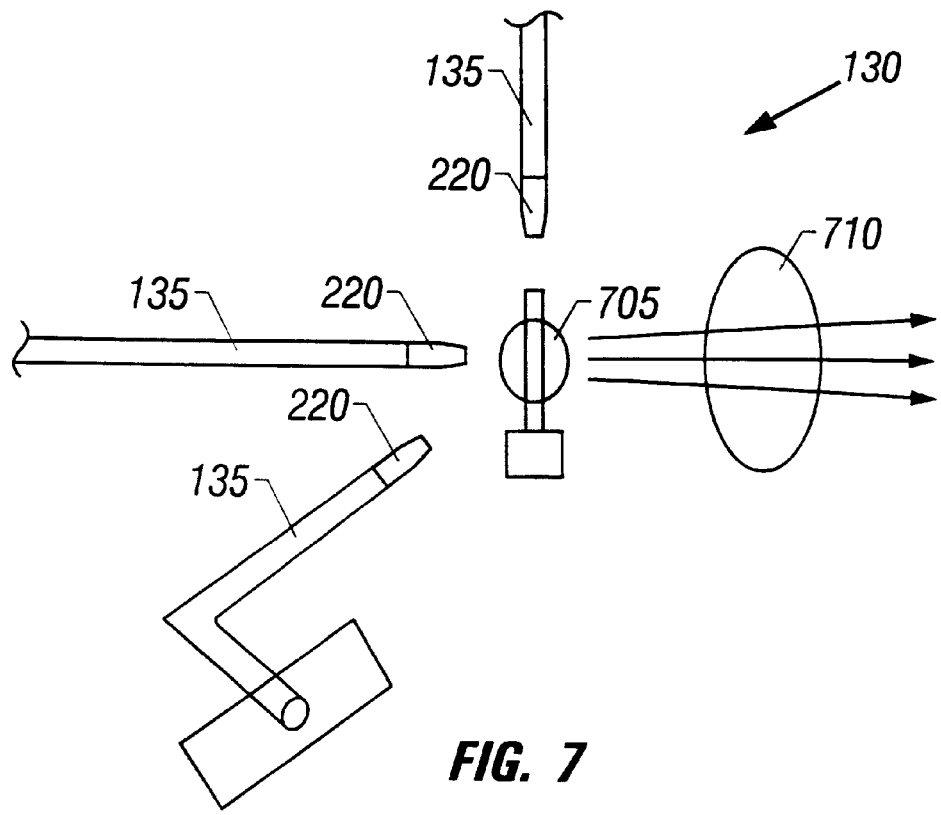
FIG. 7 shows a hybrid tail light subsystem.

The tail light subsystems 130 of FIG. 1 operate similarly to the headlamp subsystems. As shown in FIG. 7, a tail light subsystem 130 has a light source 705 that provides primary rear illumination through a lens 710. The light source 705 may be a HID lamp or another type of lighting source, such as an incandescent lamp, since the lighting requirement (in lumens) generally is less than the requirement for a headlamp. In general, an incandescent source is significantly less expensive than an HID source.

Figure 8:
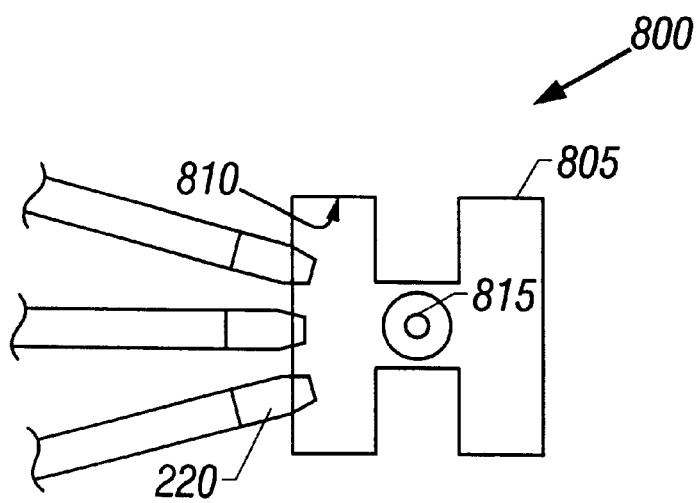
FIG. 8 shows a compact incandescent cartridge.

A compact incandescent cartridge 800, such as shown in FIG. 8, may be employed as the light source 705. The cartridge 800 includes a housing 805 having reflective, heat-dissipating interior surfaces 810. An incandescent bulb 815 is positioned in the center of the housing 805. Waveguide collector elements 220 are positioned around the light source. The incandescent cartridge 800 has a compact size, stays cool, and reduces lamp placement error, which increases efficiency. In addition, construction of the waveguide collector elements 220 from injection molding is easy and inexpensive. The cartridge 800 or similar incandescent sources may also be used as light sources elsewhere in the DLS, depending on lighting requirements. In addition, networks of cartridges 800 or incandescent sources may be interconnected to provide redundant light sources for interior or exterior lighting functions in the DLS.

Referring again to FIG. 7, waveguide collector elements 220 in the tail light subsystem are positioned close to the source 705 to receive light and transmit the light to other lighting elements, such as the rear turn signals 140, backup lights 150, and center high-mounted stop light (CHMSL) 145. A combination stop/rear turn signal light may be modulated with a LCLV 610, as discussed above with respect to the forward turn signals. The backup lights 150 and CHMSL 145, however, are modulated with electromechanical shutters 615, since they must be completely dark in the OFF mode.

Figure 9A:
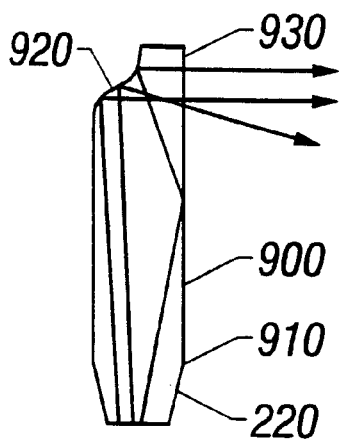
FIGS. 9A and 9B show a waveguide output bend for a tail light.
Figure 9B:
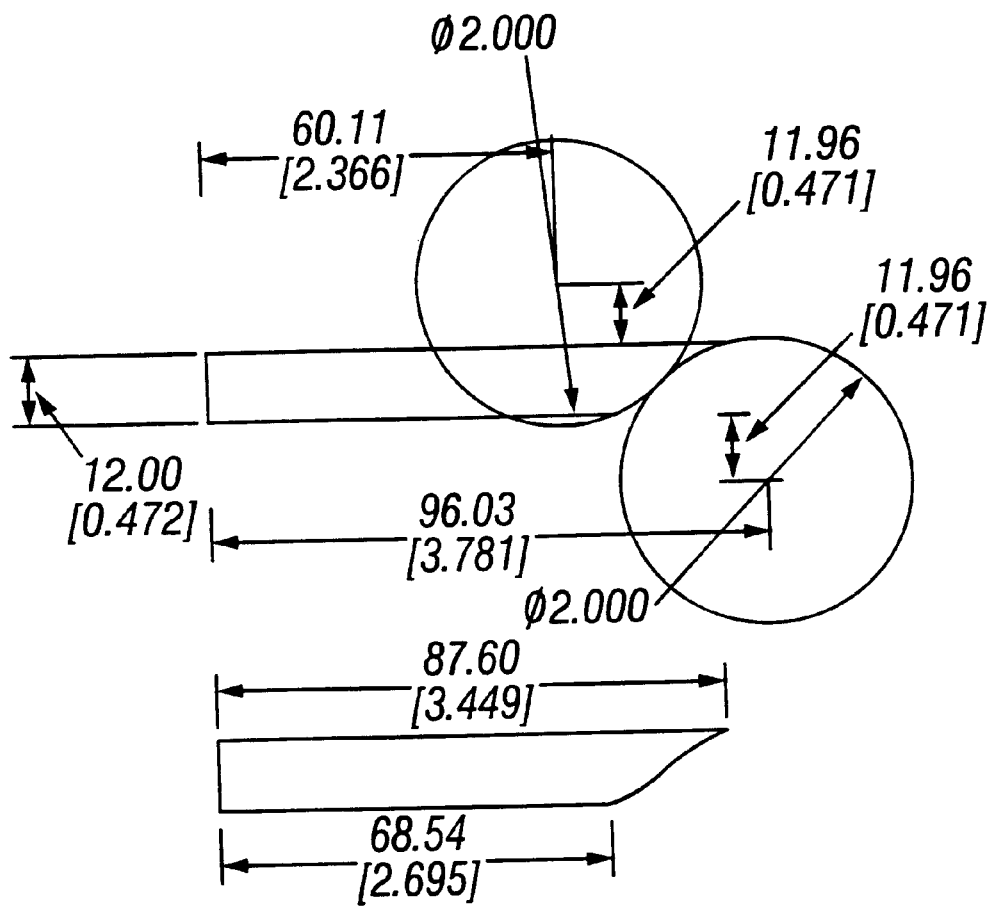

The rear turn signals subsystems 140 also may be implemented in the manner shown in FIGS. 9A and 9B. In particular, a waveguide section 900 may be used to provide a desired beam pattern for the rear turn signal. Light from a collector element 220 or an independent light source is received at the input 910 of the waveguide section 900 and is internally reflected by the surfaces of the waveguide as it propagates. The waveguide 900 includes a bend 920 immediately prior to the output 930. The outer surface of the bend 920 is s-shaped, which changes the distribution of light across the output surface 930 and hence the far field beam pattern of the turn signal. As an example, FIG. 9B shows dimensions in mm [inches] of a waveguide 900 that might be used to provide a desired beam pattern.

Figure 10A:
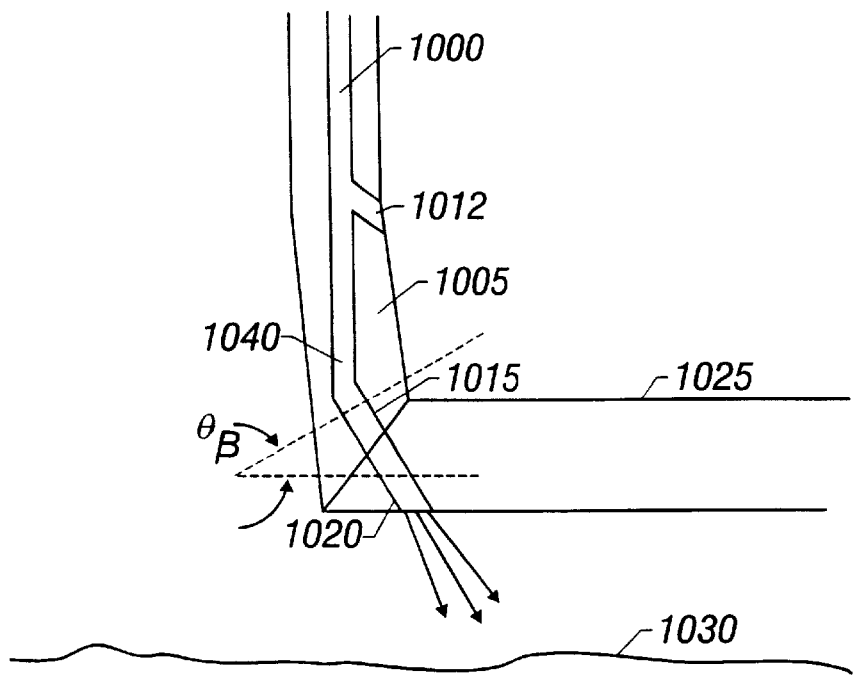
FIGS. 10A and 10B show a combination security/puddle light.
Figure 10B:
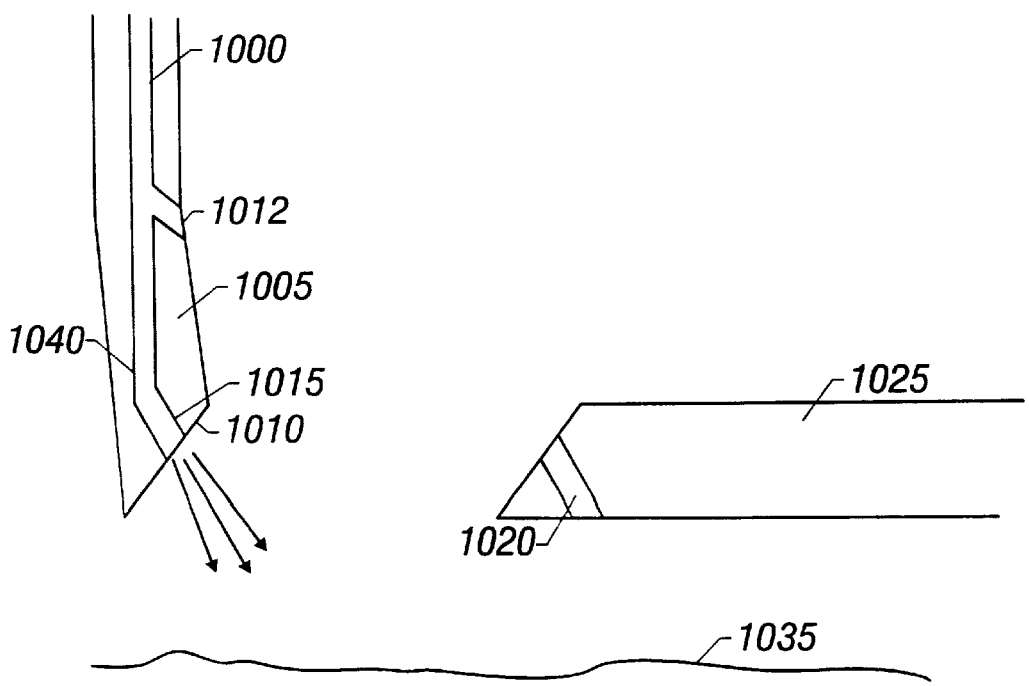

The DLS also may be used to provide other lighting functions. For example, a waveguide 1000 may be installed in the door 1005, as shown in FIGS. 10A and 10B, to provide a security/puddle light. The waveguide 1000 runs from a light source, such as the hybrid headlamp subsystem 105 (FIG. 1), to the bottom edge 1010 of the door 1005. A waveguide branch 1012 may be used to implement a interior door light. When the door 1005 is closed, as in FIG. 10A, a door waveguide section 1015 connects to a waveguide 1020 that passes through the floor 1025. The floor waveguide section 1020 provides a security light that illuminates the area 1030 underneath the vehicle. When the door 1005 is open, as in FIG. 10B, the door waveguide 1015 provides a puddle light that illuminates the ground 1035 between the open door and the vehicle. The bend 1040 in the door waveguide section 1015 may have a bend angle ($\theta_B$) of, for example, 20°. The bend 1040 helps to direct the output of the waveguide 1000 to the desired area. Alternatively, the security/puddle light may be implemented as a hybrid subsystem that has an independent light source. The independent light source may directly provide interior lighting for the vehicle in addition to being connected to the waveguide 1000 as a light source for the security/puddle light.

Another waveguide carries light from hybrid headlamp subsystem to the interior of the vehicle to provide, for example, dashboard lighting, dome lights, and reading lights. Waveguides also provide unique, aesthetically pleasing lighting effects for certain interior structures, such as cup holders, map pockets, and assist grips.

Figure 11A:
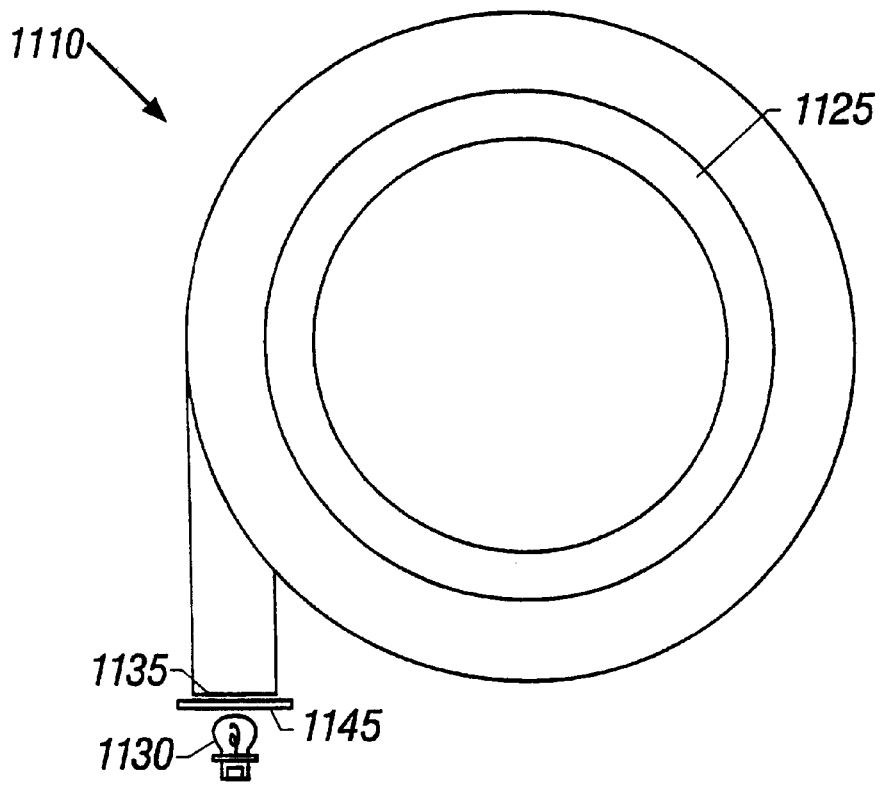
FIGS. 11A–11F show various embodiments of a cup holder illumination component.
Figure 11B:
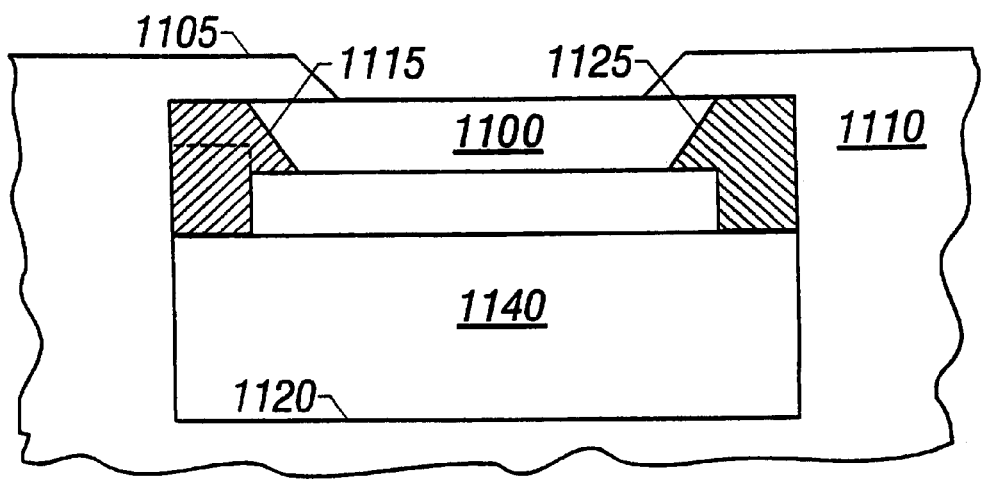

For example, as shown in FIGS. 11A and 11B, a ring-shaped waveguide element 1100 may be installed under the lip 1105 of a cup holder 1110. Although the shape of the waveguide 1100 in FIGS. 11A and 11B is circular, any shape may be used depending upon the shape and size of the cup holder 1100. The efficiency of the waveguide may be improved by selecting a ratio of the inner radius (r) of the waveguide relative to the width (w) of the waveguide. For example, a waveguide with an inner radius to waveguide width ratio (r/w) of 3:1 will lose less light than a ratio of 1:1 or 0.1:1.

The waveguide 1100 may have a protruding, angled upper region 1115 to reflect and/or transmit light downward toward the bottom 1120 of the cup holder 1110. The upper surface 1125 of the angled portion 1115 may be stippled and may be covered with a layer of opaque material to prevent leakage of light in the upward direction. A small incandescent bulb 1130 at the input 1135 of the waveguide is used as a source. A colored filter 1145 may be placed between the source 1130 and the input 1135 to achieve a desired illumination color. When illuminated, the interior 1140 of the cup holder 1110 glows faintly so as not to interfere with the driver's vision. The glowing illumination allows the occupants of the vehicle to discern the location of the cup holder 1110. Light for the waveguide 1100 also may be provided by a waveguide 135 connected to one of the lighting subassemblies.

Figure 11C:
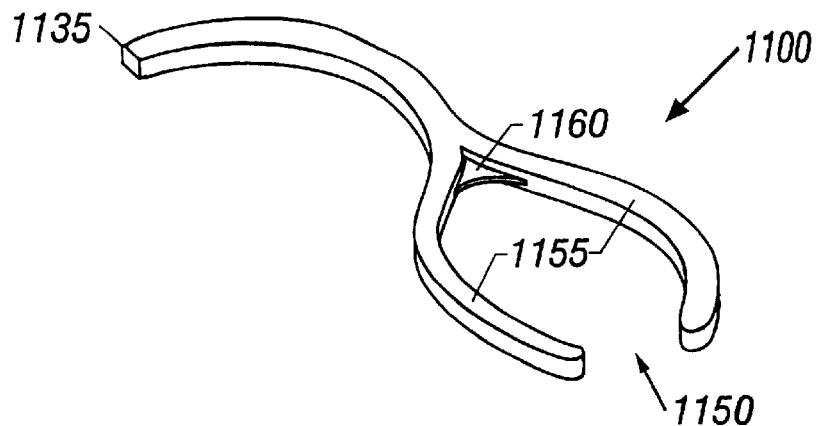
Figure 11D:
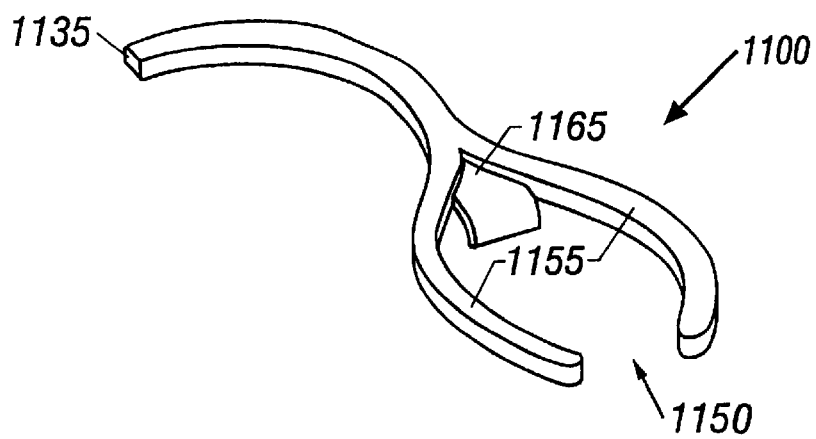

Another embodiment of the cup holder illumination waveguide 1100 is shown in FIGS. 11C–11D. These "wishbone" shaped waveguides 1100 are configured for cup holders having a gap 1150 to accommodate a mug handle. Light for the waveguide 1100 enters the input 1135 and is split essentially equally to the two arms 1155 of the wishbone. The split in the waveguide 1100 may lead to a dark area in the illumination of the cup holder. Therefore, as shown in FIG. 11C, a web portion 1160 is included between the two arms 1155. The web portion may be thinner than the rest of the waveguide 1100 and provides additional illumination to the portion of the interior 1140 of the cup holder directly beneath the split in the wishbone.

Figure 11E:
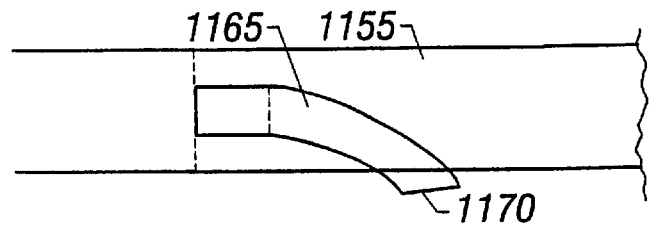

Alternatively, as shown in FIG. 11D, a tab 1165 that is thinner than the rest of the waveguide 1100 may extend downward from the split to reflect and/or transmit light toward the bottom of the cup holder. The tab 1165 has a generally rectangular cross-section and curves downward toward the bottom 1120 of the cup holder. The tab 1165 may be thinner than the rest of the waveguide 1100. As shown in FIG. 11E, the tab 1165 also may have a chamfered leading edge 1170.

Figure 11F:
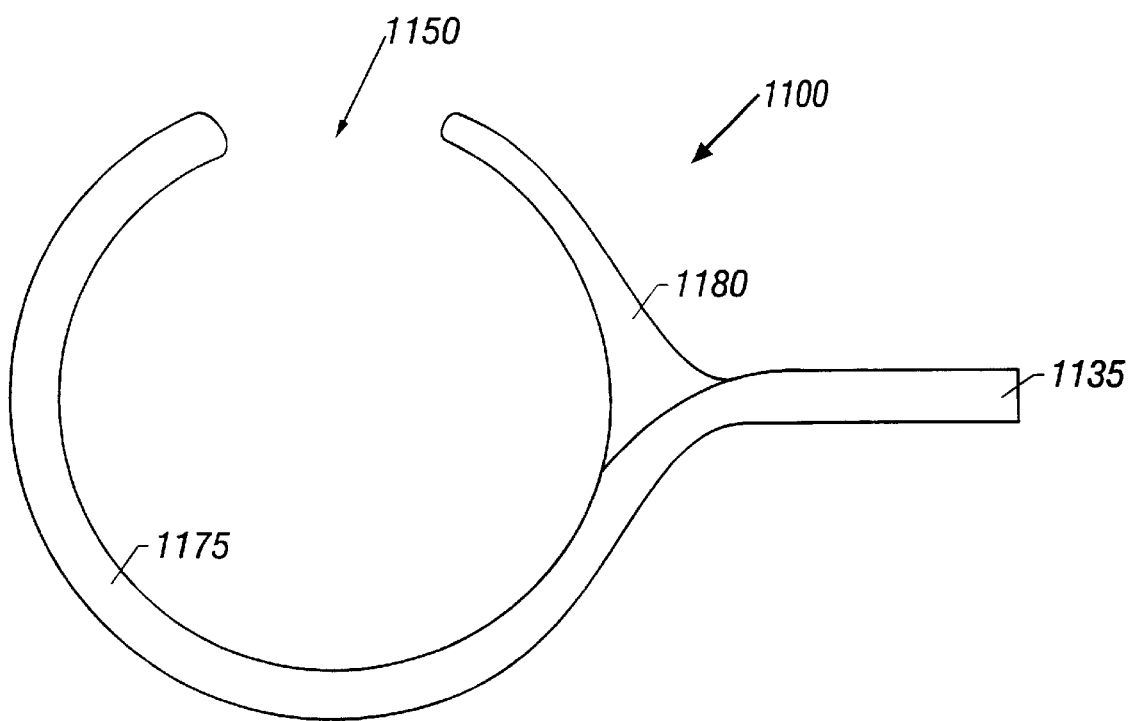

Yet another embodiment of the cup holder illumination waveguide 1100 is shown in FIG. 11F. As in the previous embodiment, the waveguide 1100 is configured for cup holders having a gap 1150 to accommodate a mug handle. Light enters the input 1135 and is split unequally between a primary arm 1175 and a secondary arm 1180. The secondary arm has a smaller cross-section, (i.e., is thinner and narrower than the primary arm 1175. Since the secondary arm 1180 is shorter than the primary arm 1175, there is less loss along its length. The smaller cross-section of the secondary arm 1180 allows less light to enter the secondary arm, which balances the light in the two arms 1175 and 1180 provides uniform illumination around the circumference of the cup holder.

Figure 12A:
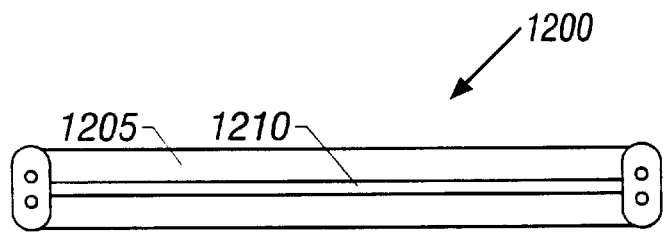
FIG. 12A is a rear view of a waveguide installed in a handgrip.
Figure 12B:
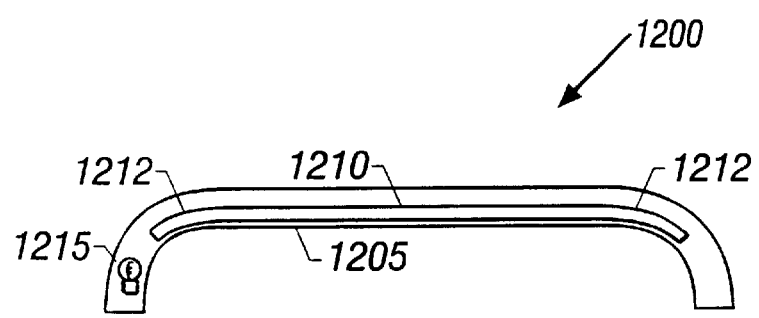
FIG. 12B is a cross-section view of a waveguide and light source installed in a handgrip.
Figure 12C:
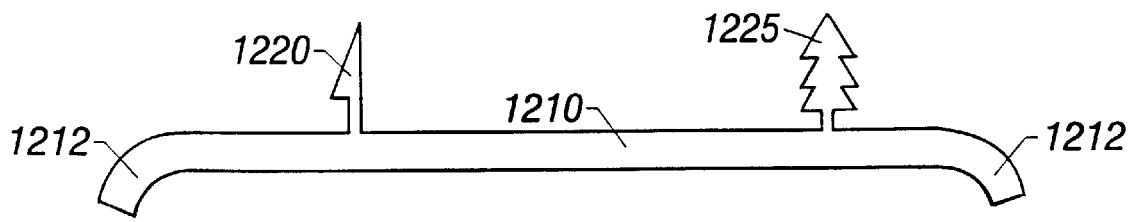
FIG. 12C shows a waveguide with integrated snaps for installation into a handgrip.

Similar structures may be used in the interior of a map pocket or, as shown in FIGS. 12A–12C, along the interior surface 1205 of a assist grip 1200. A length of waveguide 1210 is installed along the inner surface 1205. The waveguide includes bends 1212 at the ends to conform to the shape of the assist grip. A small incandescent bulb 1215 provides a light source. The bulb may be used in conjunction with a lens (not shown) to provide a courtesy light. Alternatively, the assist grip 1200 may be connected by a waveguide to another light source in the DLS. As shown in FIG. 12C, the waveguide 1210 may be formed with snaps 1220 and 1225 to make installation into the assist grip 1200 easier.

Figure 13:
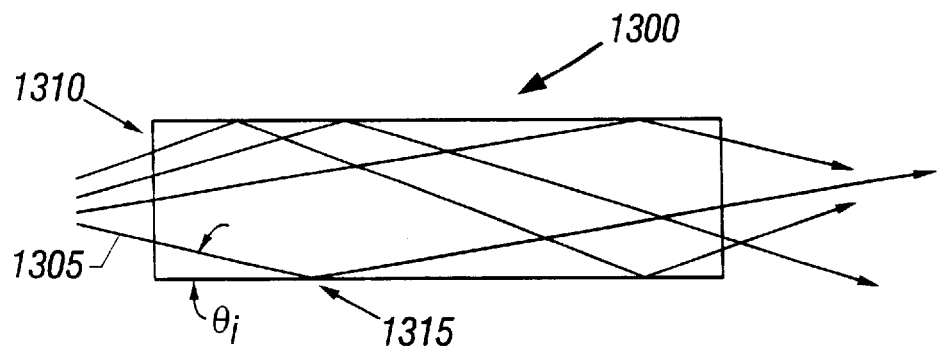
FIG. 13 is a cross-section view of an optical waveguide.

Different types of waveguide structures may be used in the DLS to transmit light from the sources to the lighting outputs. A basic waveguide, as shown in FIG. 13, may be formed from optically transparent material such as acrylic or glass. If the waveguide is formed from acrylic or a similar material, it can be manufactured using an injection molding process. The manufacture of waveguide elements using injection molding results in very low manufacturing costs compared to fiber optics. In addition, molded acrylic waveguide elements are more rigid than fiber optics, can be installed by robots, and generally do not require maintenance. Waveguide elements can also achieve much smaller bend radii than fiber.

As shown in FIG. 13, a light ray 1305 entering the input face 1310 proceeds through the waveguide 1300 until the light ray 1305 reaches an outer surface 1315 of the waveguide 1300, i.e. an interface between the material of the waveguide 1300 and air. At the outer surface 1315, light is reflected in accordance with Snell's law. If the angle of incidence ($\theta_i$) of the light ray 1305 at the outer surface 1315 is less than a threshold referred to as the critical angle ($\theta_c$), then the light ray 1305 is reflected internally, with no light escaping. This phenomenon is known as total internal reflection. The critical angle depends on the index of refraction of the material of which the waveguide is composed relative to that of the material surrounding the waveguide, (e.g., air). For example, if the waveguide were made from acrylic, which has an index of refraction of approximately 1.5, and surrounded by air, the critical angle, $\theta_c$, would be:

$$\theta_c = \arcsin(n_a/n_b) = \arcsin(1/1.5) = 41.8$$

where $n_a$ is the index of refraction of air (1.0) and $n_b$ is the index of refraction of acrylic (1.5).

Figure 14A:
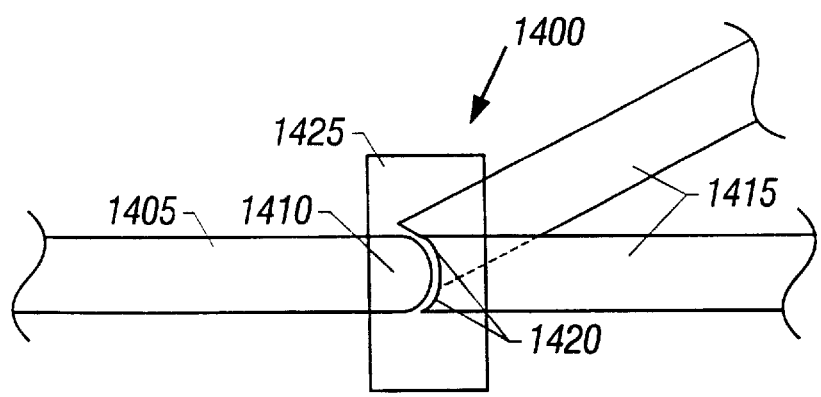
FIGS. 14A and 14B are side and bottom views of a waveguide joint.
Figure 14B:
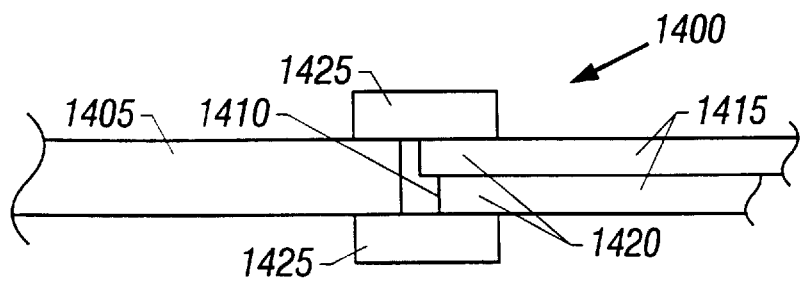

Referring to FIGS. 14A and 14B, a waveguide joint 1400 may be used to distribute light in the DLS. For example, the joint may be used to provide light to a door of the vehicle. The waveguide joint 1400 has a trunk section 1405 with a convex curved end 1410. Branch sections 1415 having convex curved ends 1420 adjoin the trunk section 1405. The branch sections may be held in place by a plastic band 1425 surrounding the joint region or by epoxy or snaps. Light input to the trunk section 1405 is essentially split among the branches 1415. The branches 1415 may be positioned to carry light to different sections of the vehicle. With this configuration, it is possible to reconfigure the branches 1415 in the event of design changes. Epoxy that has an index of refraction approximately equal to that of the waveguide, i.e., that is index-matched, may be used to hold the branches 1415 in place. The joint 1400 may have only a single branch 1415 that is used to change the direction of the trunk 1405 or to provide a hinged connection. A hinged connection using the joint 1400 may be installed, for example, in a car door. Index-matched fluid may be used to lubricate and reduce discontinuity at the interface between the trunk 1405 and the branch 1415, which will reduce the loss through the joint 1400.

Figure 15:
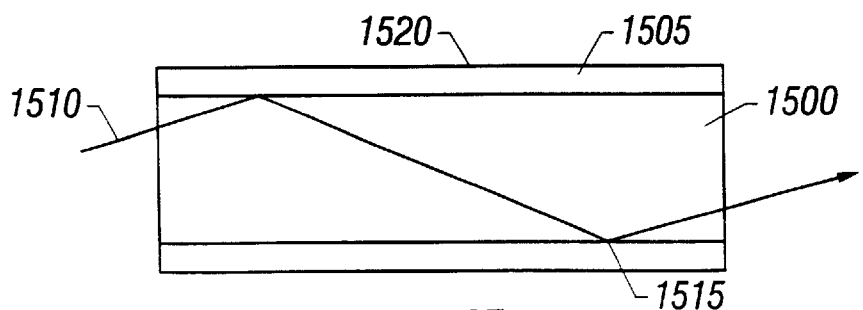
FIG. 15 is a cross-section view of an epoxy-coated optical waveguide.

FIG. 15 shows a waveguide core 1500 encased in a layer of epoxy 1505. The epoxy 1505 coating 1505 may be applied by dipping the waveguide core 1500 (which may be formed, for example, from acrylic) in a reservoir of epoxy and allowing the coating to dry or by spraying. The epoxy 1505 has a lower index of refraction than the waveguide 1500. The distribution of light in the waveguide peaks at the center of the waveguide and diminishes toward the edges of the waveguide. Overall, a significant portion of the light is confined within the waveguide core 1500.

The epoxy coating 1505 offers several advantages compared to an uncoated waveguide. For example, contaminants on the surface of an uncoated waveguide can cause light at the waveguide/air interface to be scattered and transmitted outside of the waveguide instead of being internally reflected, which increases loss in the uncoated waveguide. The epoxy layer 1505 increases the distance between the contaminants and the waveguide core 1500, which reduces the amount of light that reaches the waveguide/air interface. If the epoxy does not adhere to the waveguide, then the resulting air gap also will help to keep the light separated from contaminants on the surface of the waveguide structure. In addition, plastic coatings can be applied to the outside surfaces 1520 of the epoxy layer, and clamps and other fixtures can be attached to the outside surfaces 1520 with reduced effect on light transmission through the waveguide 1500. One also could use a waveguide formed from polycarbonate (which has an index of refraction of 1.58) with an outer coating of epoxy (which typically has an index of refraction of 1.4 or less). Alternatively, one could use a waveguide having a glass core and an outer coating having a lower index of refraction.

Figure 16A:
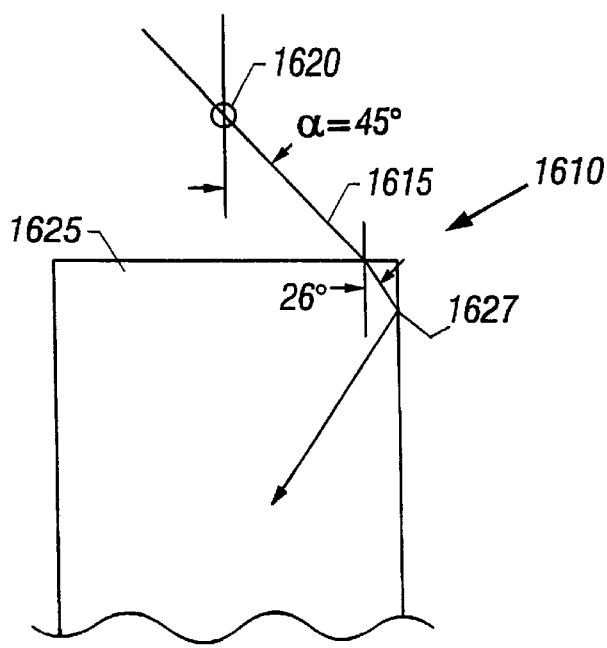
FIGS. 16A–16C are cross-section views of non-tapered and tapered waveguide inputs.
Figure 16B:
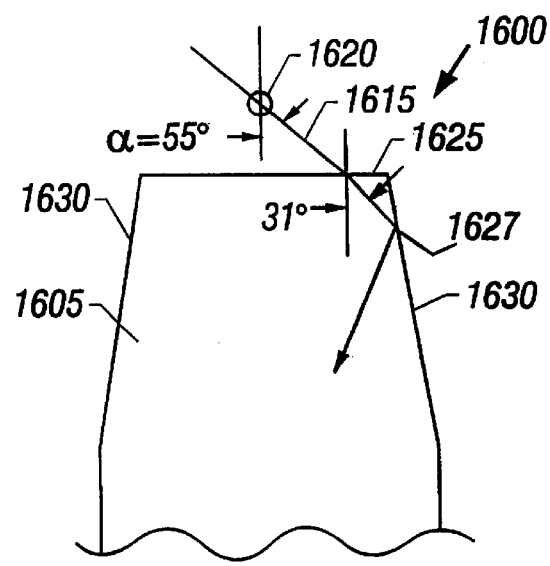
Figure 16C:
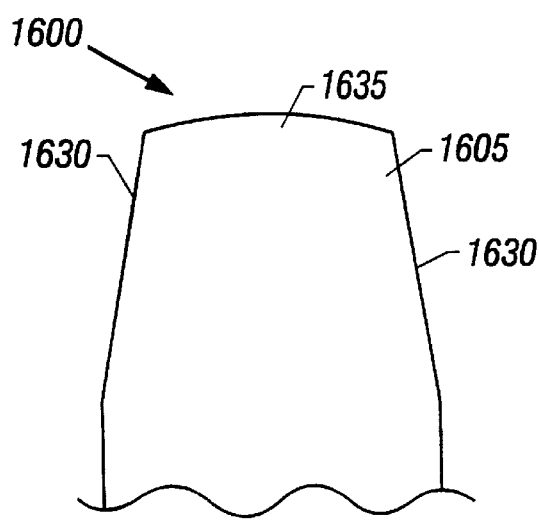

As shown in FIGS. 16A–C, a waveguide 1600 may have a pinched end that acts as a collector element 1605. The collector element 1605 increases the acceptance angle ($\alpha$) of the waveguide 1600 and thereby increases light collection efficiency. The end of the waveguide 1600 may be pinched in two dimensions to form an essentially trapezoidally shaped collector element 1605. The collector element 1605 may be formed on the end of a waveguide 1600 having a cross-section that is rectangular, round, or other shapes.

For example, FIG. 16A shows a waveguide 1610 without a pinched end. Light 1615 from a light source 1620 enters the waveguide 1610 at an angle of 45°. At the input face 1625, the light is bent in accordance with Snell's Law to form an angle of 26° with respect to a direction perpendicular to the input face 1625. The light reaches the outer edge 1627 of the waveguide at an angle of 26° and is confined within the waveguide by internal reflection.

FIG. 16B shows a waveguide 1600 with a pinched end. Light enters the input face at an angle of 55°. Hence, the acceptance angle of the pinched waveguide 1600 can be made greater than the acceptance angle of the waveguide 1610 without the pinched end. At the input face 1625, the light is bent to form an angle of 31° with respect to a direction perpendicular to the input face 1625. The light reaches the outer edge 1627 of the waveguide at an angle of 26° (since the inclined walls 1630 of the pinched portion are angled inward by 5°) and is confined within the waveguide by internal reflection.

As shown in FIG. 16C, the pinched end of the waveguide 1600 may be formed so that an excess of material at the tip of the waveguide 1600 bulges outward to form a lens 1635 with a desired focal length. The lens 1635 focuses received light, further increasing the acceptance angle of the waveguide 1600.

Figure 17A:
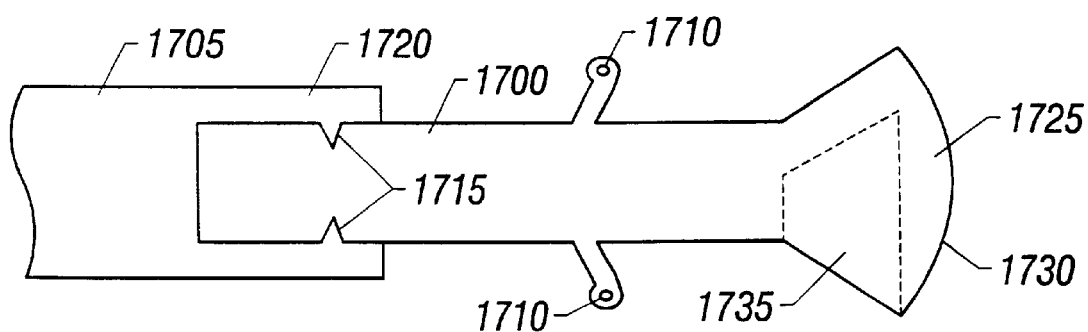
FIGS. 17A and 17B are cross-section views of waveguide sections having integrated installation components and an integrated output structure.

The waveguides may be formed as a set of standard components that may be easily interconnected and used as building blocks for different applications. For example, FIG. 17A shows waveguides 1700 and 1705 having integrated installation elements, such as snaps 1710 and detents 1715. Snaps 1710 can be formed during the injection molding of the waveguide 1700 and provide a convenient means for securing the waveguide 1700 within the vehicle. The snaps are sized and angled to minimize light loss through the snap. For example, the snap may form a 60° angle with the waveguide (toward the direction that light is travelling though the waveguide). The vehicle may have brackets to receive the snaps 1710 or a screw may be inserted into a snap 1710 to secure the waveguide to a mounting surface. The detents 1715 enable the waveguide 1700 to be securely connected to another waveguide 1705 having an integrated claw structure 1720. Each waveguide may be formed with a detent 1715 at one end and a claw structure 1720 at the other.

Figure 17B:
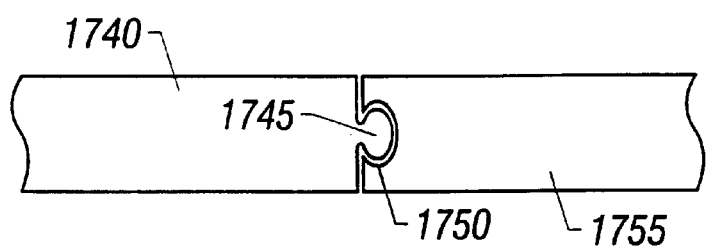

FIG. 17B shows waveguides with integrated connection elements. A waveguide 1740 may have a key 1745 formed at one end. The key 1745 is configured to mate with a socket 1750 of another waveguide 1755. These connection elements may cause a loss of approximately 4% at each interface, however, the connection elements increase the ease with which waveguide components can be installed. Index-matched epoxy or fluid may be used at the interface to secure the connection and reduce losses.

In addition to the installation and connection elements, the waveguide 1700 widens at one end into an output element 1725 having a convex curved surface 1730. The curved surface 1730 of the output element 1725 essentially acts as a lens to provide a desired light output characteristic. The output element 1725 may form an illumination element for the vehicle, e.g., a courtesy light in the door of a vehicle. A portion of the widened waveguide end may be eliminated, leaving an air gap 1735, while maintaining desired output characteristics. The air gap 1735 decreases the weight and cost of the waveguide 1700.

Figure 18:
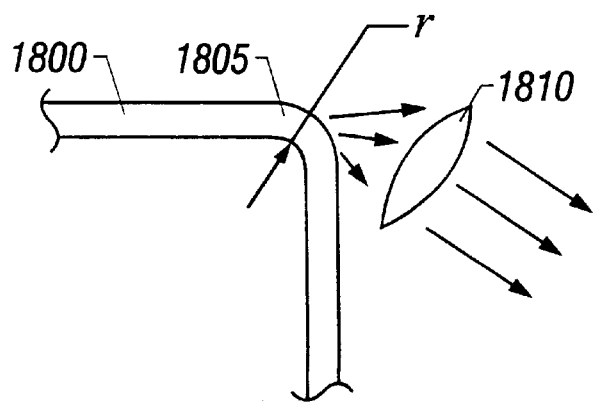
FIG. 18 shows a leaky waveguide bend and focusing lens.

Another configuration for an output element is shown in FIG. 18. A waveguide 1800 has a bend 1805 that is configured to allow a portion of the light travelling in the waveguide to escape at the bend 1805. A lens 1810 may be used to focus the light to form a desired beam pattern. The amount of light released at the bend 1805 (or reflected back toward the input) can be controlled by determining the inner radius (r) of curvature of the bend 1805 relative to the width (w) of the waveguide 1800. For example, a bend with a inner bend radius to waveguide width ratio (r/w) of 3:1 will result in a loss of less than 5% of the total light in the waveguide (the losses including light released at the bend and light reflected back toward the input). A bend ratio of 1:1 will result in a loss of approximately 30–35%, and a bend ratio of 0.1:1 will result in a loss of approximately 65–70%. Not all of the light lost in the waveguide enters the lens, however the amount of light entering the lens will be proportional to the amount of light released at the bend.

Figure 19A:
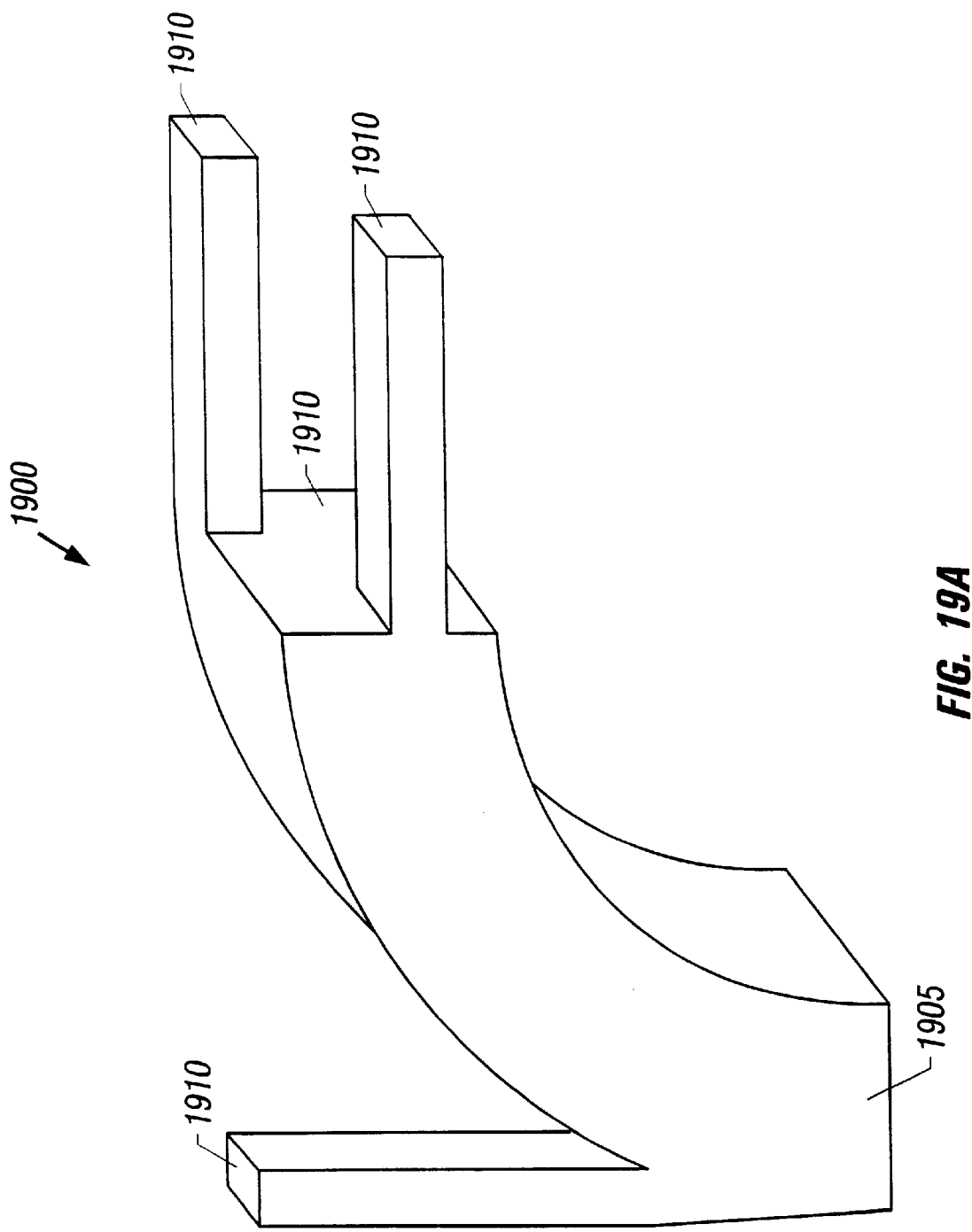
FIGS. 19A and 19B show cross-section views of optical manifolds.
Figure 19B:
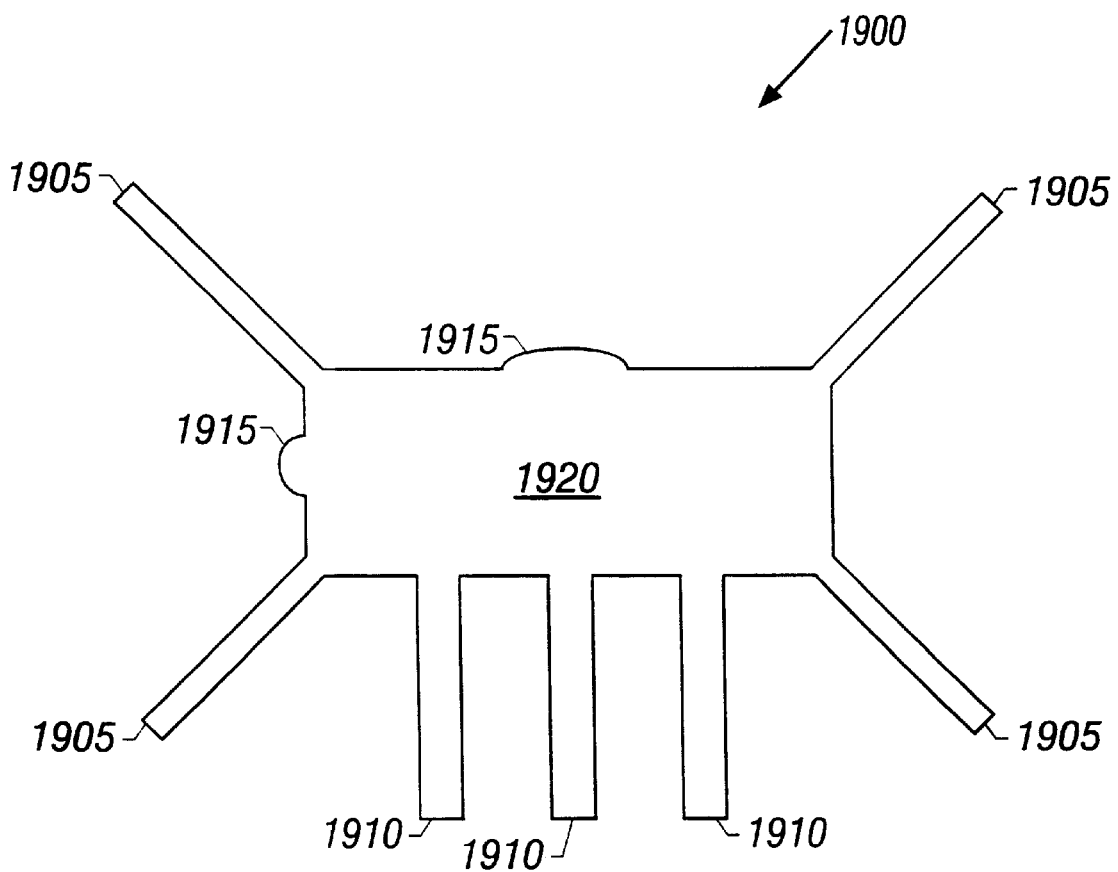

An optical manifold 1900, as shown in FIGS. 19A and 19B, is another useful building block for a DLS. Light enters the optical manifold 1900 through one or more inputs 1905 and is split to one or more of the output arms 1910. Alternatively, light may enter through one or more output arms 1910 and exit through the inputs 1905. The output arms 1910 may branch off at multiple points from the optical manifold in multiple directions to direct light to other subsystems of the DLS in various locations within the vehicle. The size of the output arms 1910 and their locations determines the proportion of the light input to the manifold that is split to each arm.

As shown in FIG. 19B, the optical manifold 1900 may include integrated output elements 1915. The output element 1915 may be lens-like structures that provide lighting functions within the vehicle, such as a reading lights or dashboard lights. The manifold 1900 may have multiple input 1905 and output arms 1910 and a portion 1920 where light from the various inputs is combined. Each input and output may use colored filters to achieve desired lighting effects.

A DLS may incorporate optical waveguide structures that provide an integrated structure for collecting and distributing light from a light source. As shown in FIGS. 20A–20H, a waveguide collar 2000 collects light from a light source 2010 and divides the light among output arms 2020 that extend from the light source 2010. The arms lie in an azimuthal plane relative to the light source.

Figure 20A:
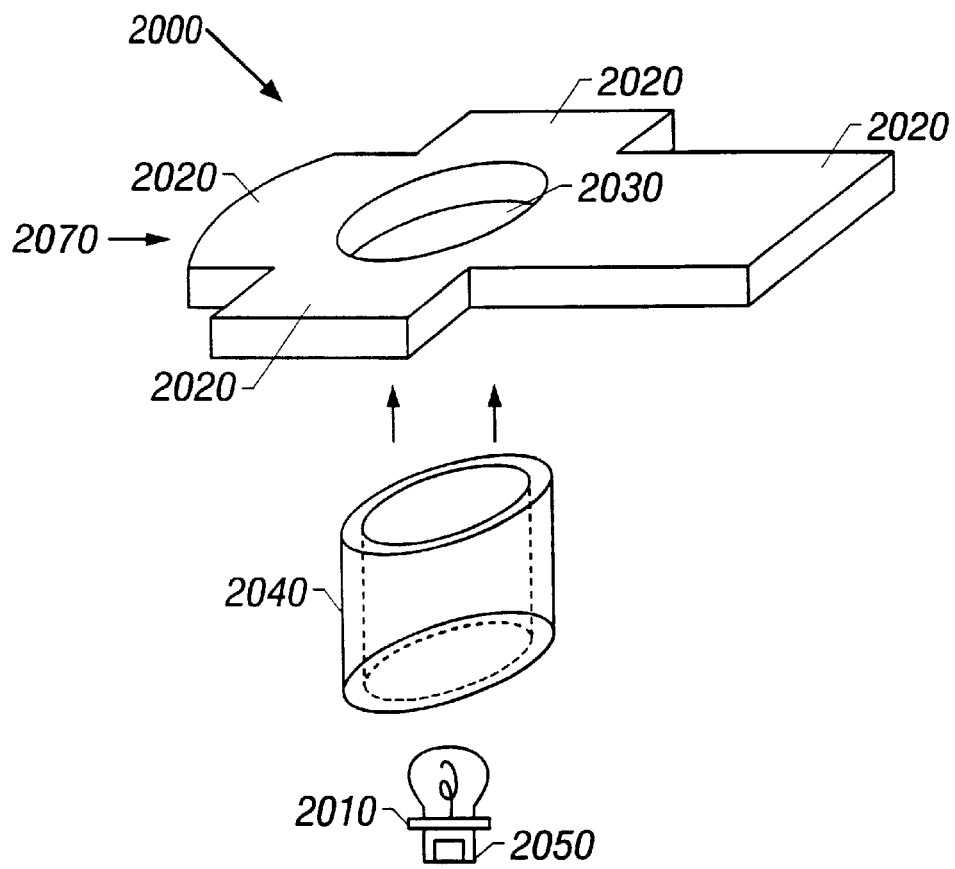
FIGS. 20A–20H show waveguide collars with four arms and a light source with a cylindrical sleeve.

For example, as shown in FIG. 20A, the waveguide collar 2000 is a planar structure in the shape of a cross. The collar 2000 has four output arms 2020 and an opening 2030 in the center for accommodating a light source 2010, although the number of arms may vary. The light source 2010 may be enclosed in a cylindrical sleeve 2040, which is inserted into the opening 2030 in the waveguide collar 2000. Light from the light source passes through the sleeve 2040 into the collar 2000, where it is divided into the output arms 2020. The cylindrical sleeve 2040 may be used with any of the waveguide collar configurations discussed below. Several waveguide collars 2000 may be stacked on a single sleeve 2040 to form a multi-layer structure. In addition, the cylindrical sleeve 2040 may be connected to or integrated with the base 2050 of the light source as discussed below.

Figure 20B:
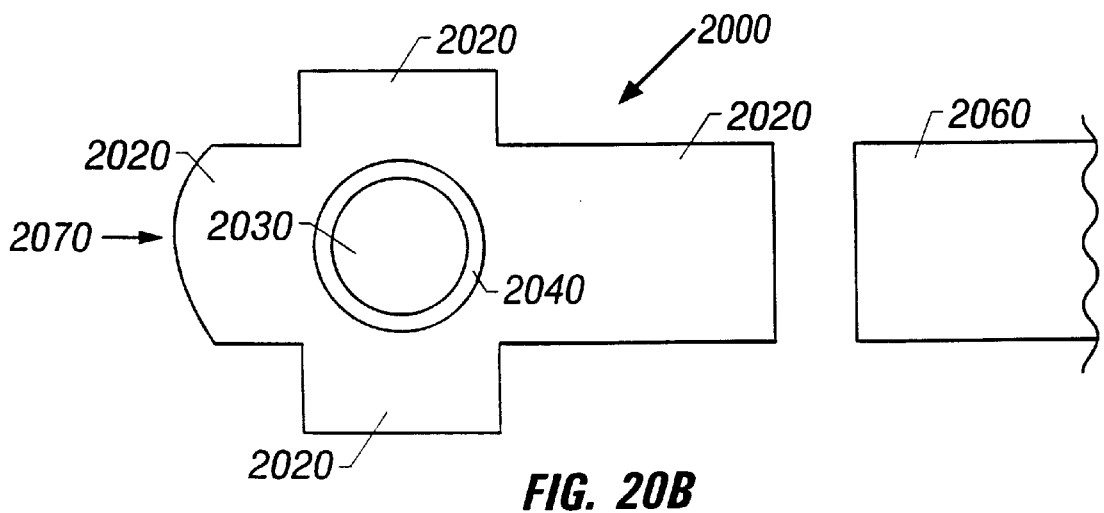

The output arms 2020 of the waveguide collar 2000 may be connected to other components in the DLS or may have integrated output elements, such as a lens 2070. The lens 2070, which is located at the end of the output arm 2020, transmits light away from the waveguide to provide illumination for the interior or exterior of the vehicle. Waveguides 2060 may be connected to the output arms 2020, as shown in FIG. 20B. Integrated installation elements, such as the snaps, claws and detents described above with respect to FIGS. 17A and 17B, may be used to connect the waveguides to the output arms.

Figure 20C:
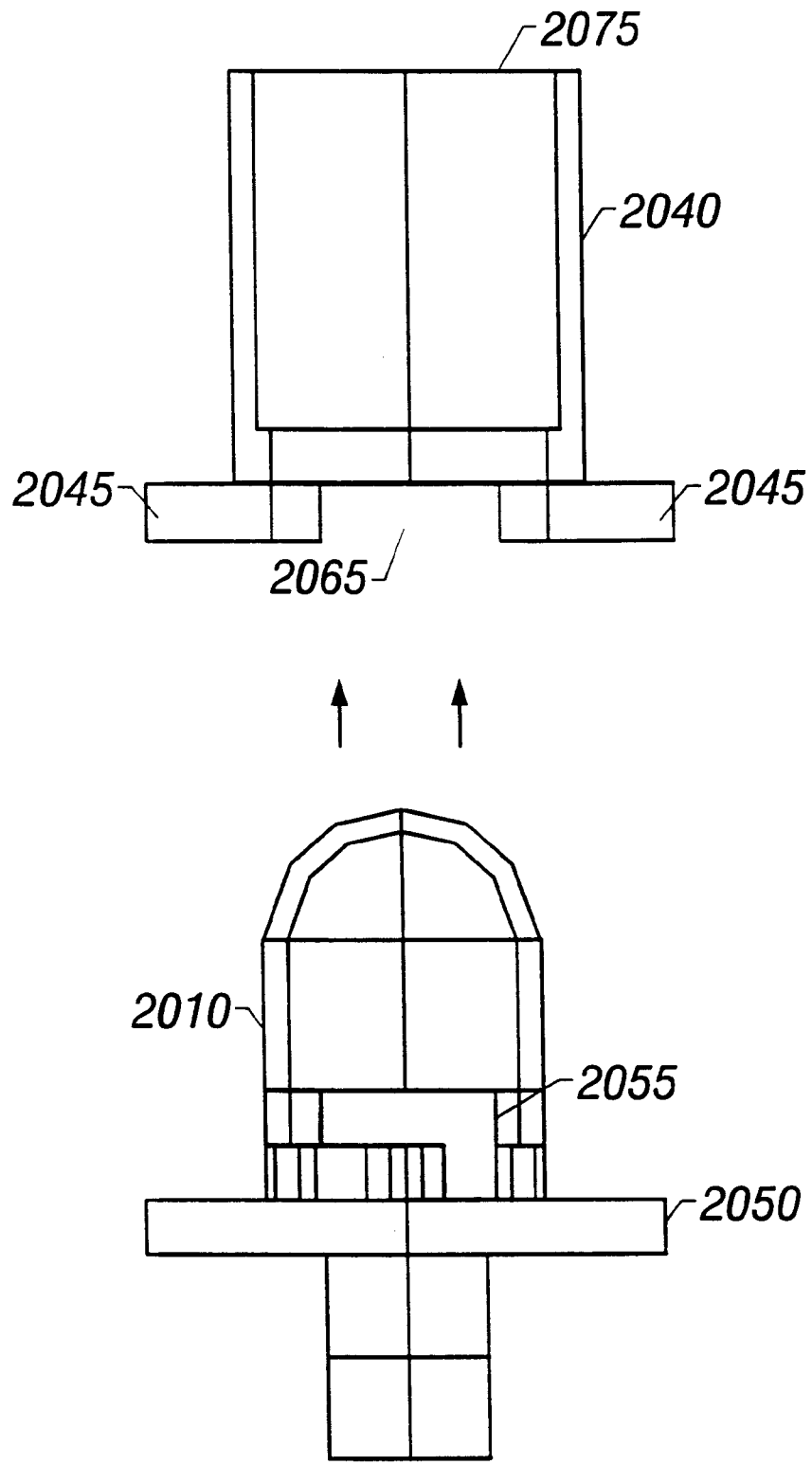
Figure 20D:
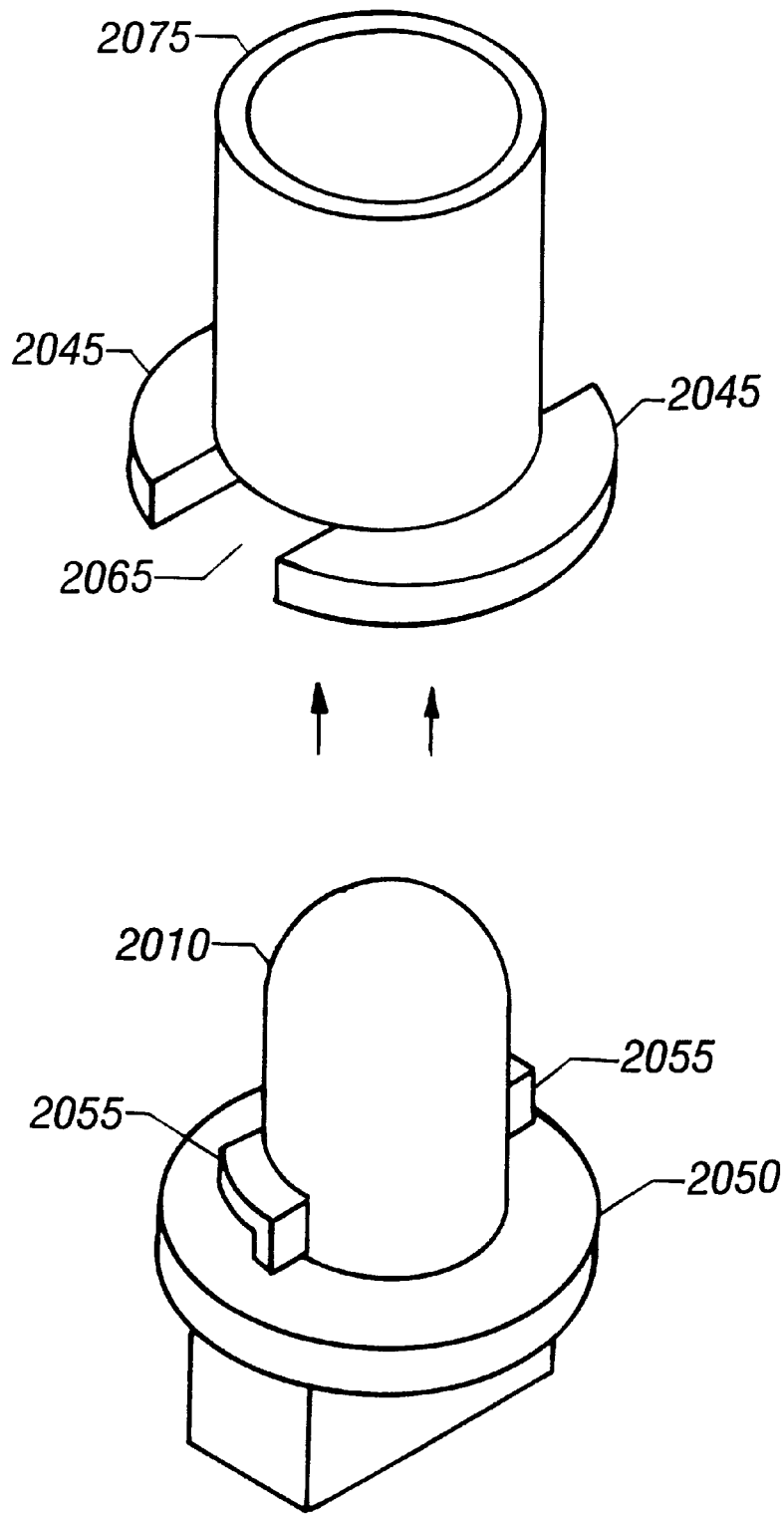
Figure 20E:
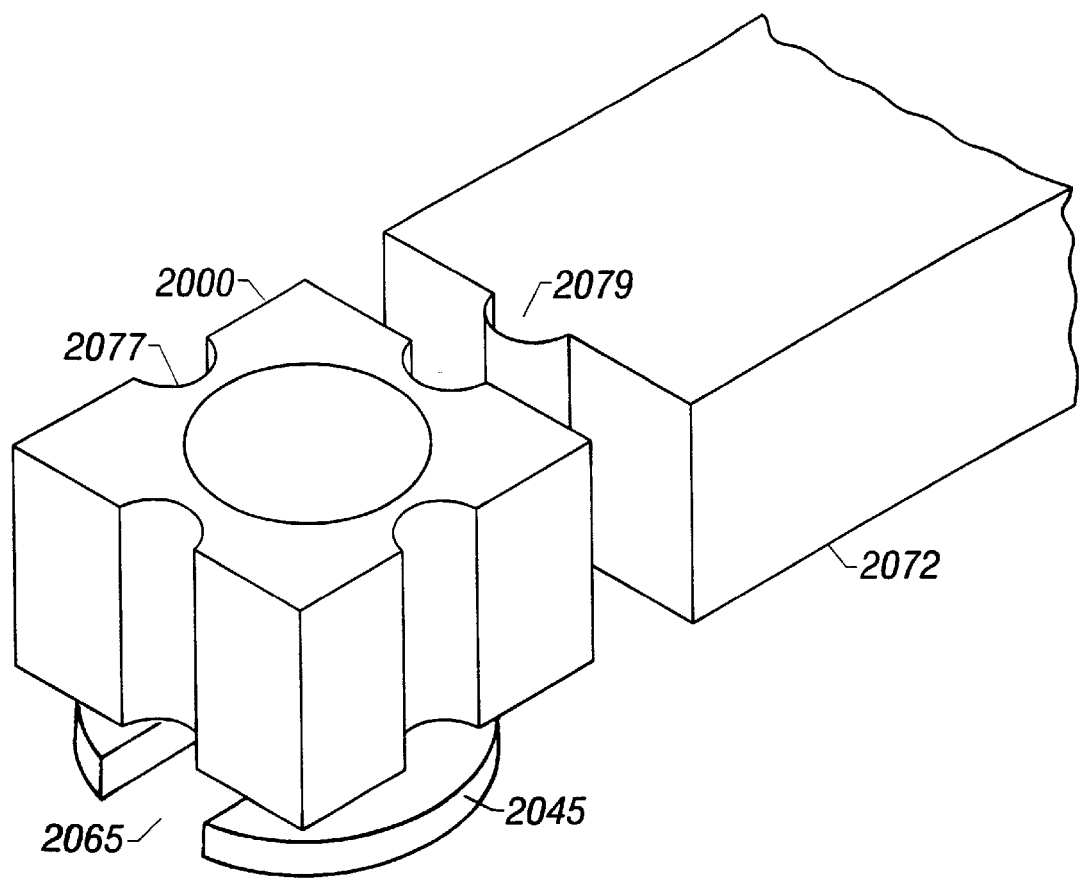
Figure 20E:
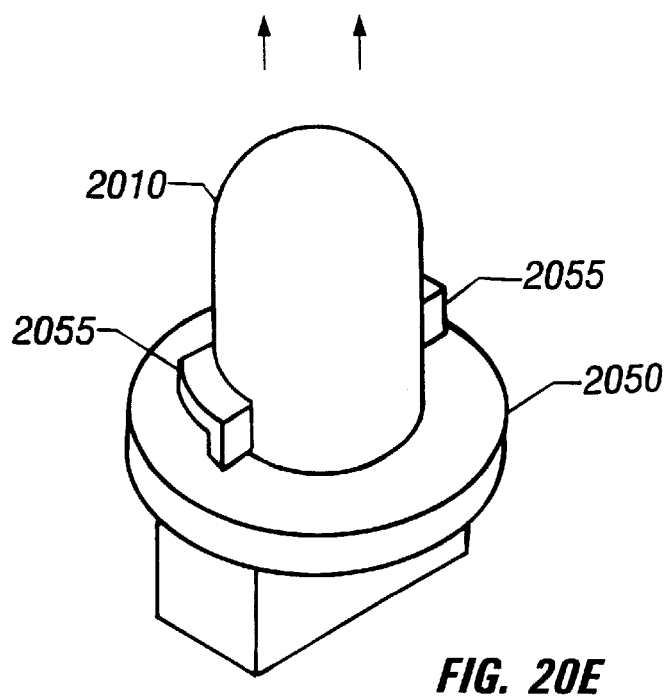

As shown in FIGS. 20C and 20D, the cylindrical sleeve 2040 may have a rim 2045 for connection to the lamp base 2050. The lamp base has locking tabs 2055 which may be inserted into the gap 2065 between the rim 2045 portions of the sleeve 2040. The lamp base is twisted so the locking tabs engage the rim 2045 and hold the light source 2010 in place within the sleeve 2040. Alternatively, as shown in FIG. 20 E, a waveguide collar 2000 may have an integrated rim 2045 for connection to a lamp base 2050. The collar may have alignment notches 2077 configured to accommodate alignment tabs 2079 on the end of a connecting waveguide 2072.

Figure 20F:
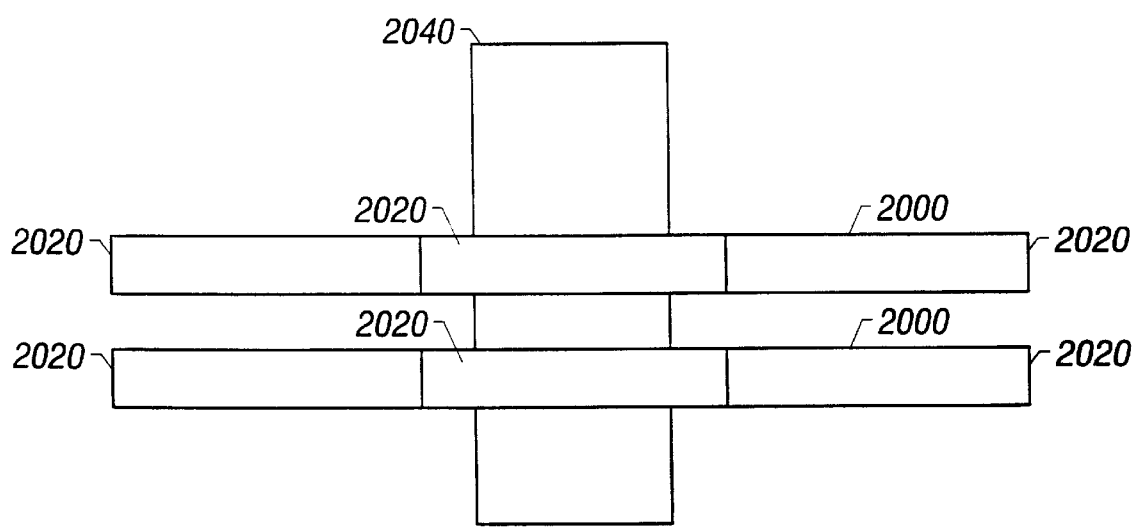

The sleeve 2040 provides several advantages. For example, as shown in FIG. 20F, multiple waveguide collars 2000 can be stacked on a single sleeve 2040, allowing light to be distributed through multiple collars 2000 with a single light source 2010. Such a configuration increases system design flexibility.

In addition, the upper portion of the sleeve 2040 reflects a portion of the light from the light source 2010 through internal reflection so that the light exits from the top 2075 of the sleeve. Light entering the sleeve at an angle less than the critical angle passes through the sleeve and enters the waveguide collar 2000 (the angle being measured with respect to a direction perpendicular to the sleeve wall). Light entering the sleeve at an angle greater than the critical angle is internally reflected by the sleeve. In this manner, the sleeve forms a hybrid lighting system that allows the light source 2010 to function as a source for both a direct lighting function (through the top of the sleeve) and a distributed lighting function (through a network connected to a waveguide collar).

Figure 20G:
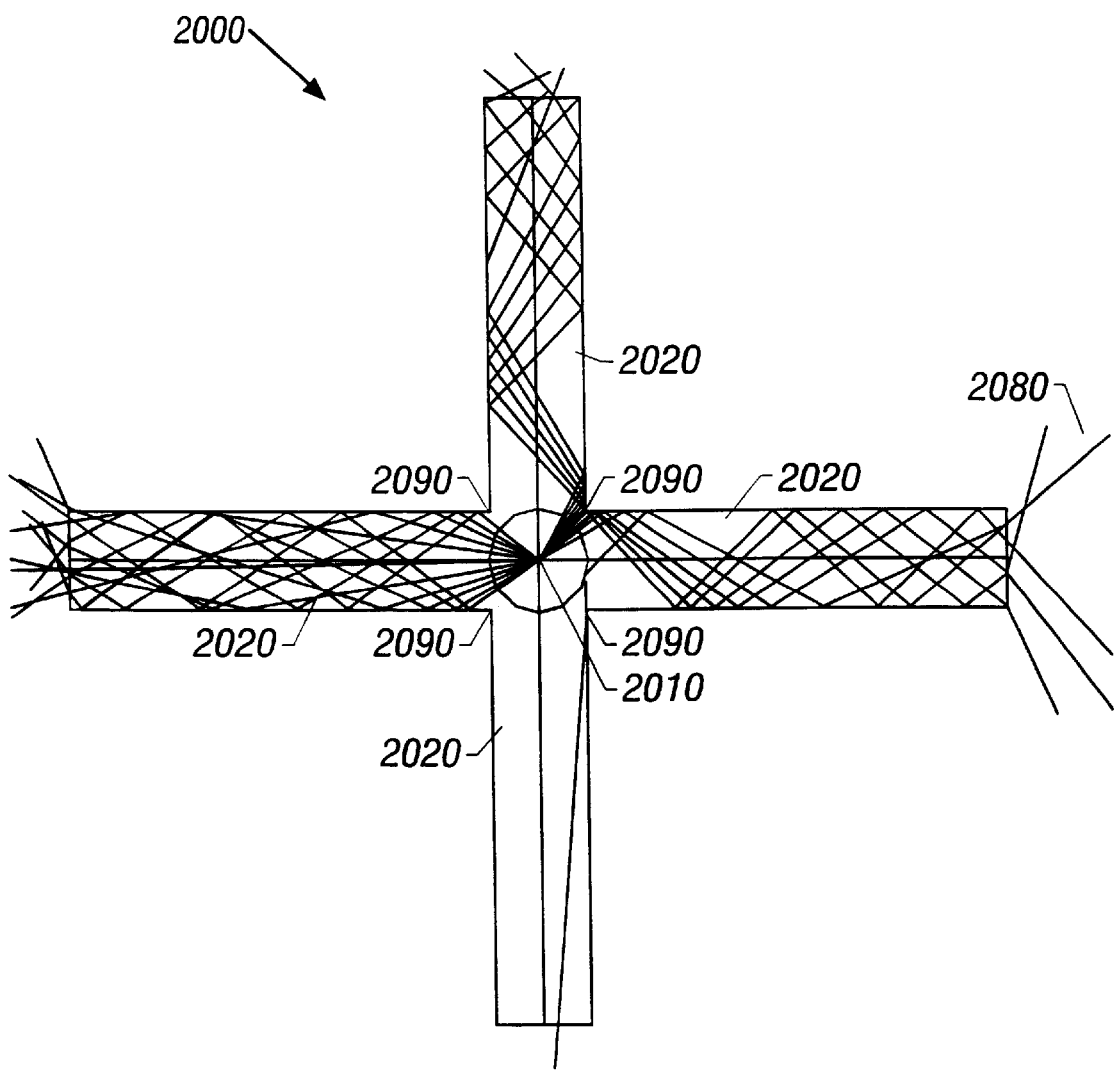
Figure 20H:
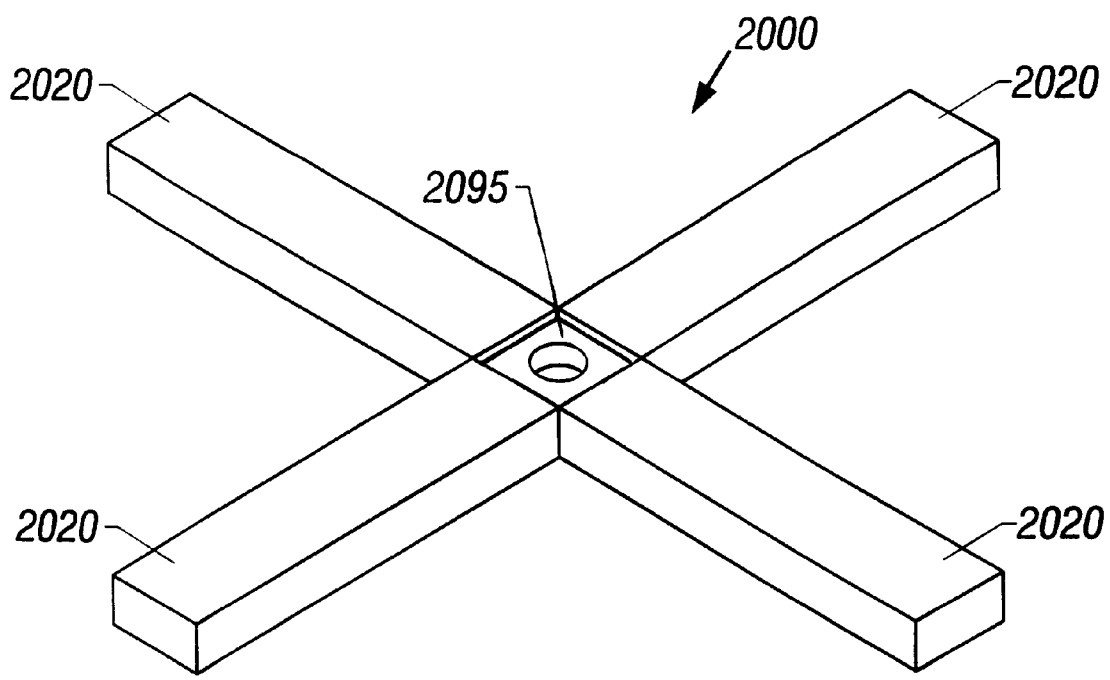

FIG. 20G shows a light ray 2080 diagram for a four-arm waveguide collar 2000. For reasons of clarity, only a portion of the light rays 2080 from the light source 2010 are traced in the diagram. Ordinarily, light emanates uniformly from the light source 2010 in the plane of the waveguide collar (the azimuthal plane). The waveguide collar collects light from the light source and divides it among the four output arms 2020. In this example, the vertices 2090 are positioned relative to the light source 2010 so that essentially all of the light collected is distributed into one of the output arms 2020, i.e., light does not escape at the vertices 2090. FIG. 20H shows a perspective view of a four-arm waveguide collar 2000. The central portion 2095 may be tapered or stepped to improve the light collection efficiency with respect to the light source.

Figure 21A:
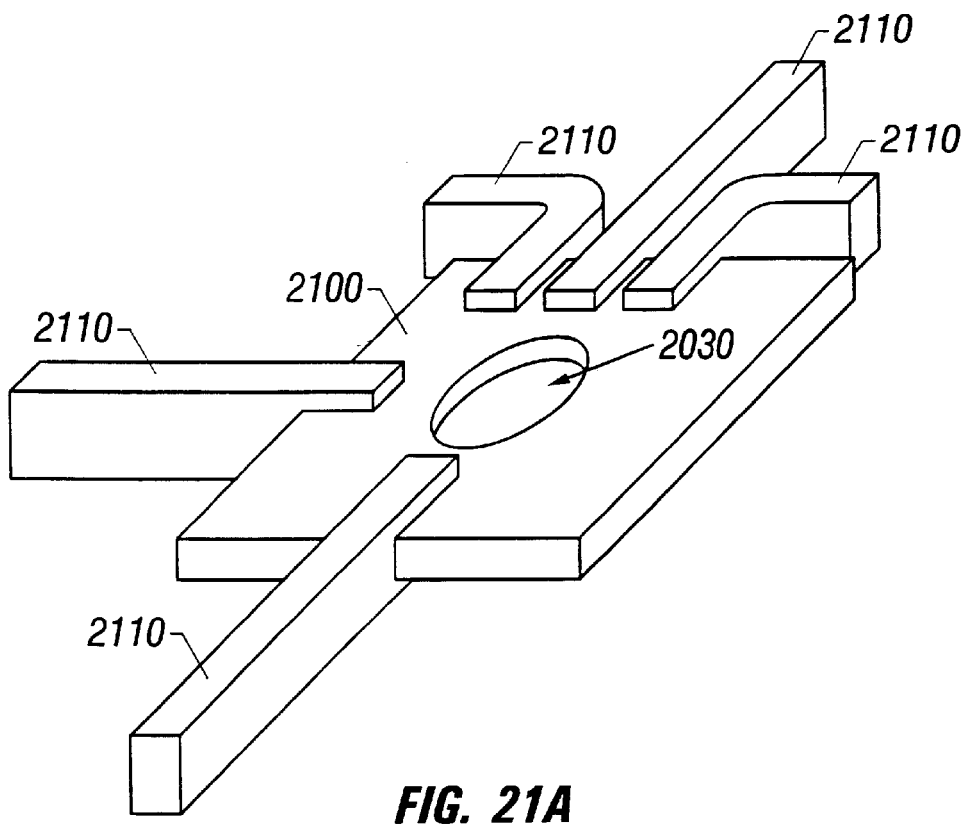
FIGS. 21A–21B show alternative configurations of a waveguide collar.
Figure 21B:
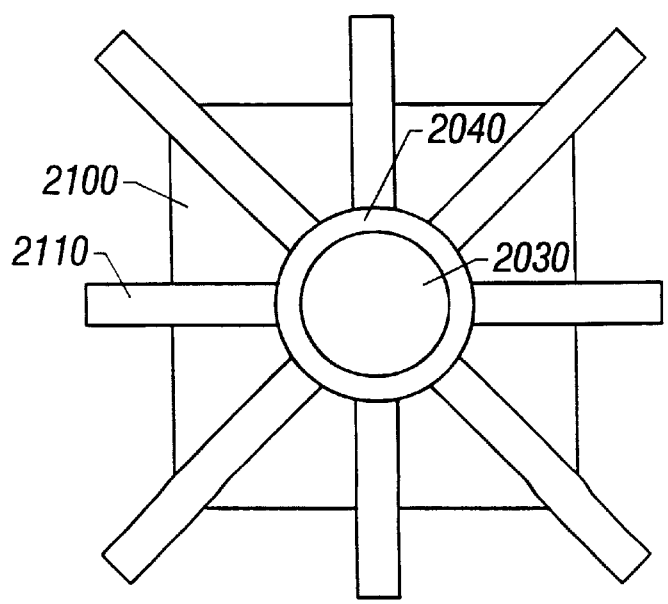

FIGS. 21A and 21B show alternative configurations of the waveguide collar 2100. The collar 2100 is a planar structure that surrounds and collects light from a light source (not shown) positioned in an opening 2030 in the center of the collar 2100. Waveguides 2110 may be mounted on the top surface of the collar 2100 or may be embedded in the collar as shown in FIG. 21A. The waveguides 2110 may be positioned radially with respect to the light source, as shown in FIG. 21B. A cylindrical sleeve 2040 may surround the light source, as described above. The collar 2100 serves as a hybrid lighting element by providing both a direct lighting function (in the direction perpendicular to the plane of the collar) and a distributed lighting function (through the connected waveguides).

Figure 22:
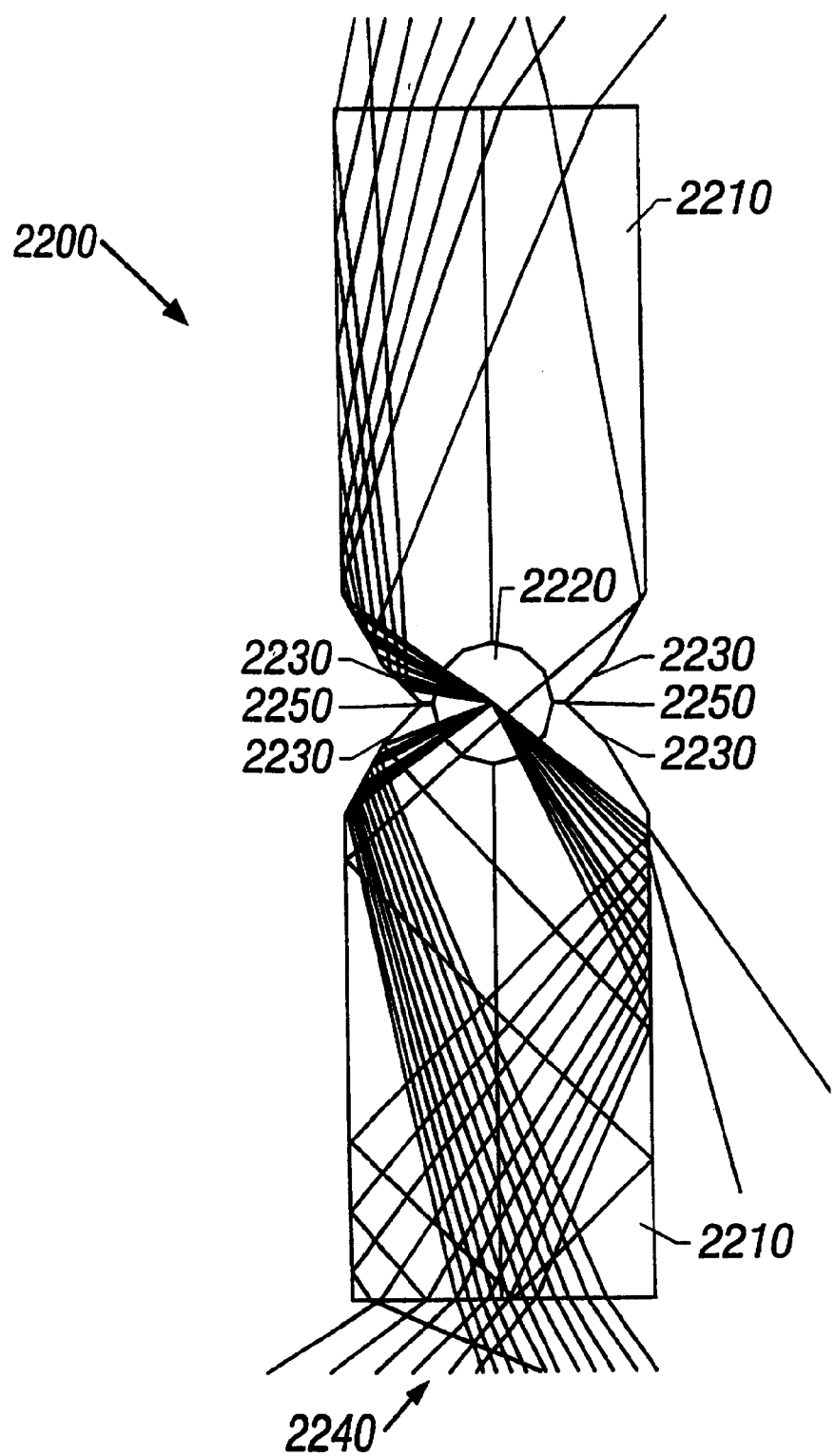
FIG. 22 is a waveguide collar with two arms.

FIG. 22 shows another alternative configuration of the waveguide collar 2200. The collar has two arms 2210 that extend from opposite sides of the light source opening 2220. The sides of the output arms include convex, curved surfaces 2230 at the center of the collar 2200. As shown by the light ray tracings 2240, the curved surfaces 2230 at the vertices 2250 improve light collection by reflecting light that would have been transmitted out of the sides of the collar (if the sides were not curved) and directing the light into the two output arms.

Figure 23A:
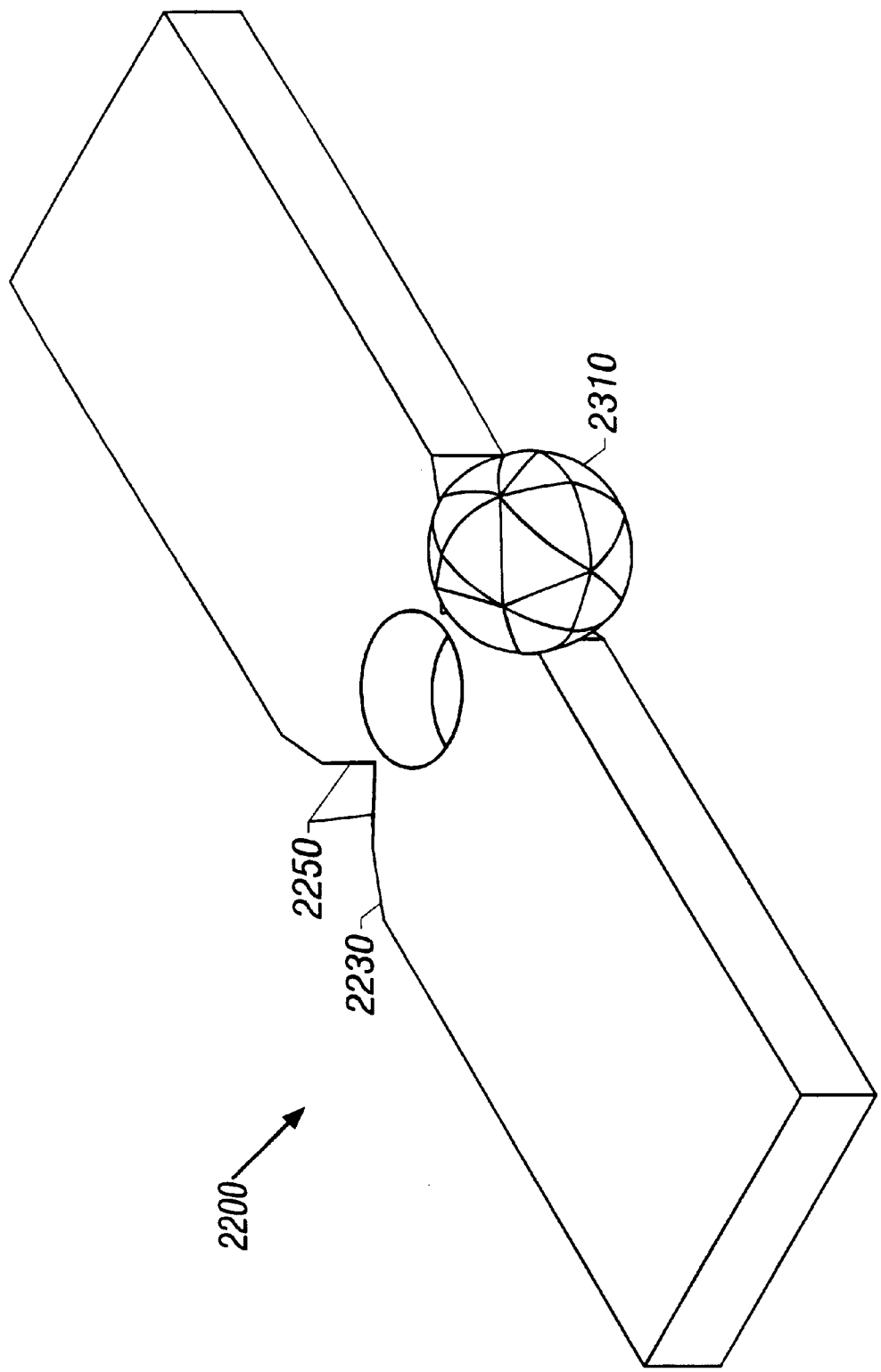
FIGS. 23A–23B show waveguide collars with two arms and integrated output lenses.
Figure 23B:
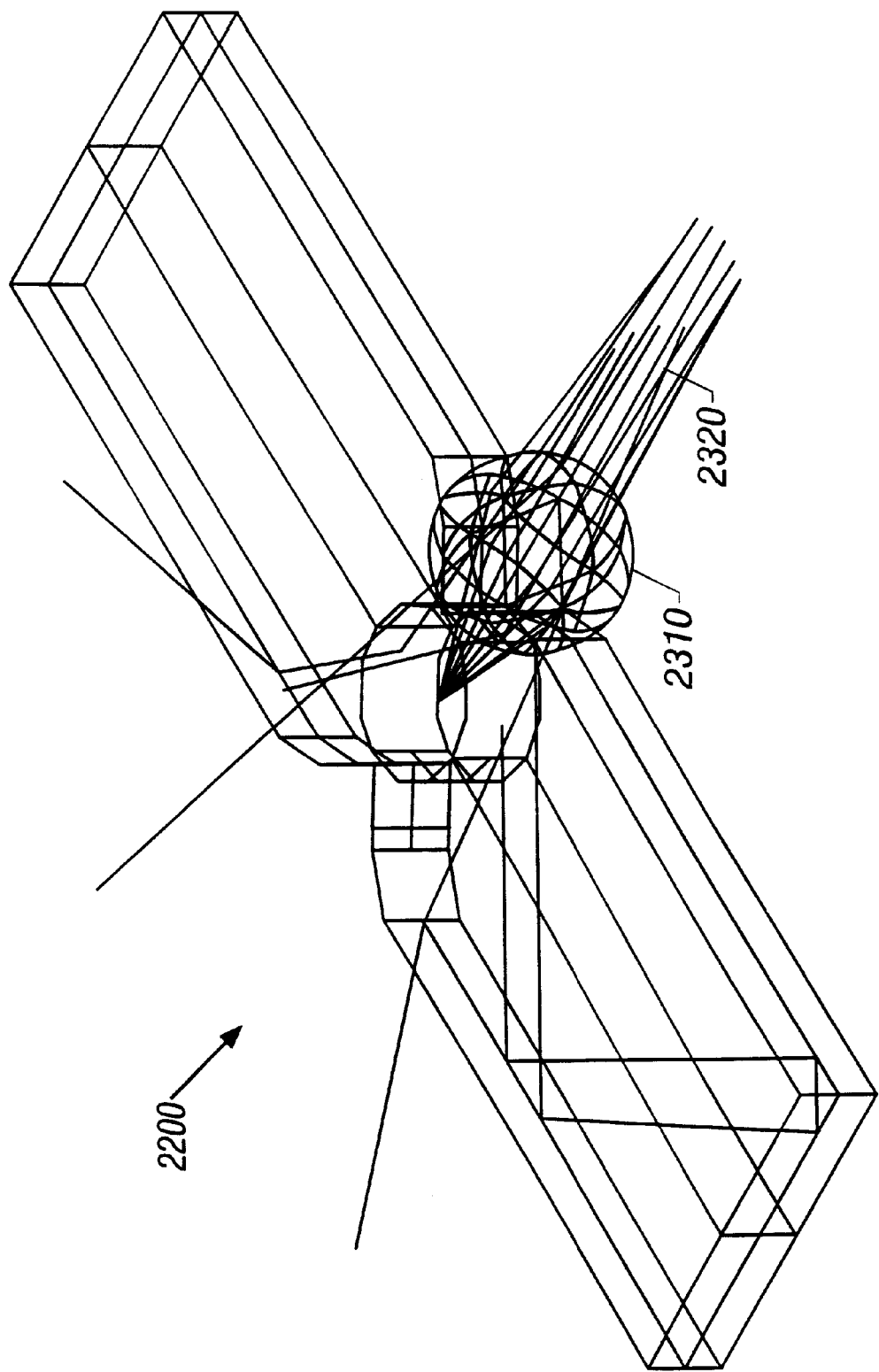

As shown in FIGS. 23A and 23B, optical components, such as lens 2310, may be positioned at the vertices 2250 of the curved surfaces 2230. The lens 2310 may be formed along with the rest of the waveguide collar in a single injection molding step. The lens 2310 may have a variety of shapes: cylindrical, spherical, parabolic, Fresnel, polyhedral, etc. The lens 2310 receives light through the side facing the light source, focuses light through internal reflection and outputs the light through the opposite side. The output light rays 2320, as shown in FIG. 23B, are focused and, as such, tend to converge at some distance from the lens 2310.

Figure 24:
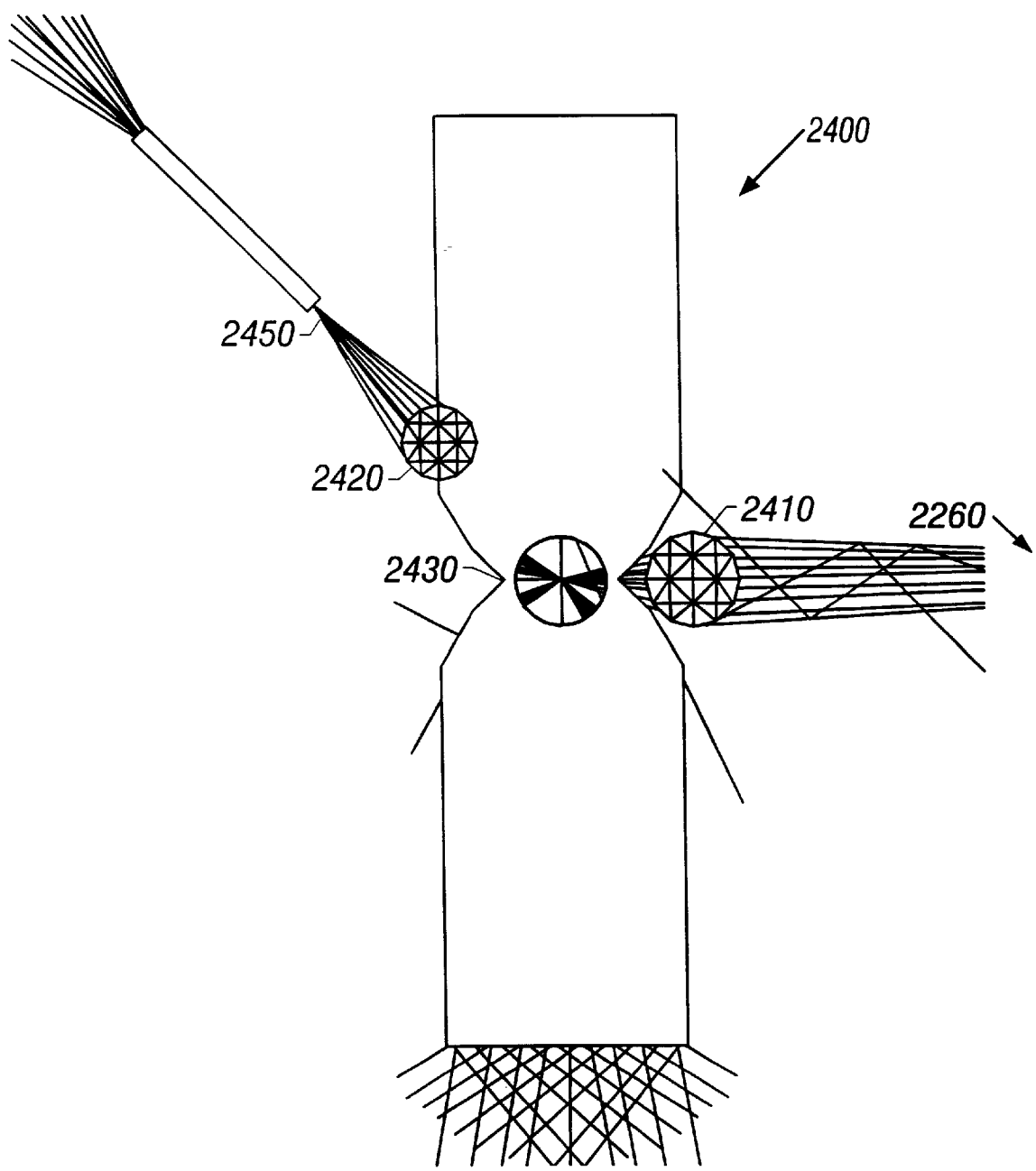
FIG. 24 is a light ray diagram for a waveguide collar with two arms and two output lenses.

As shown in FIG. 24, a lens 2420 also may be positioned at points on the waveguide collar other than the vertices 2430. The light output by the lenses 2410 and 2420 may be focused, for example, on the input of a waveguide 2450 or on a target location 2460 on the interior or exterior of a vehicle, such as a keyhole. The molded integral lenses provide several advantages. For example, a waveguide collar with a lens serves as a hybrid lighting element, i.e., the collar performs both a direct lighting function and a distributed lighting function. In addition, system complexity and manufacturing costs may be reduced by having a one-step, injection molding manufacturing process.

Waveguide collar assemblies may be combined with integrated optical components, as shown in FIGS. 25A–25E, to form a modular DLS 2500. The modular system provides flexibility and increased efficiency in DLS design and decreases system complexity and manufacturing costs. The modular system also makes it easier to provide light source redundancy.

DLS 2500 includes three light sources 2505, 2510 and 2515 with waveguide collars and integrated molded lens outputs. The first light source 2505 is positioned within a four-arm waveguide collar. The ends of the first 2520 and second 2525 arms split into separate outputs that connect to other waveguides 2530 or terminate in light output elements, such as molded lenses 2535 or open-ended waveguides 2540. The third arm terminates with an integrated molded lens output 2545.

Figure 25A:
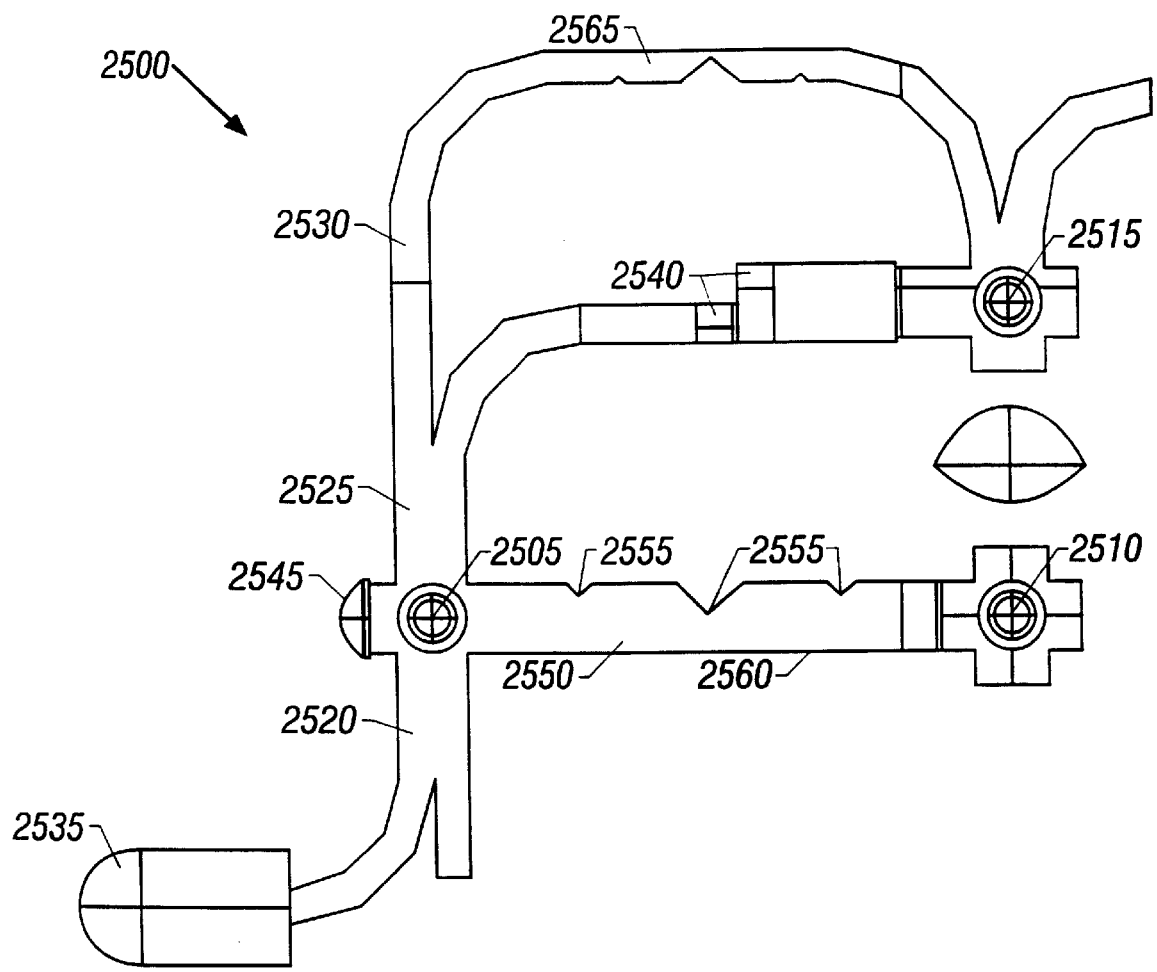
FIGS. 25A–25E are views of a modular distributed lighting system.
Figure 25B:
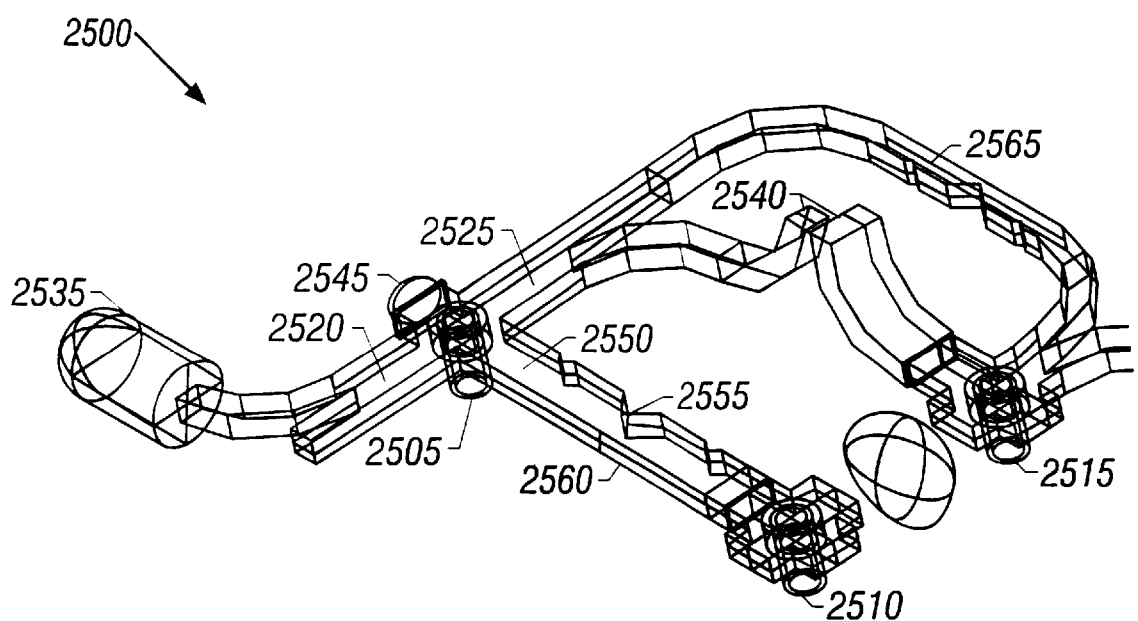
Figure 25C:
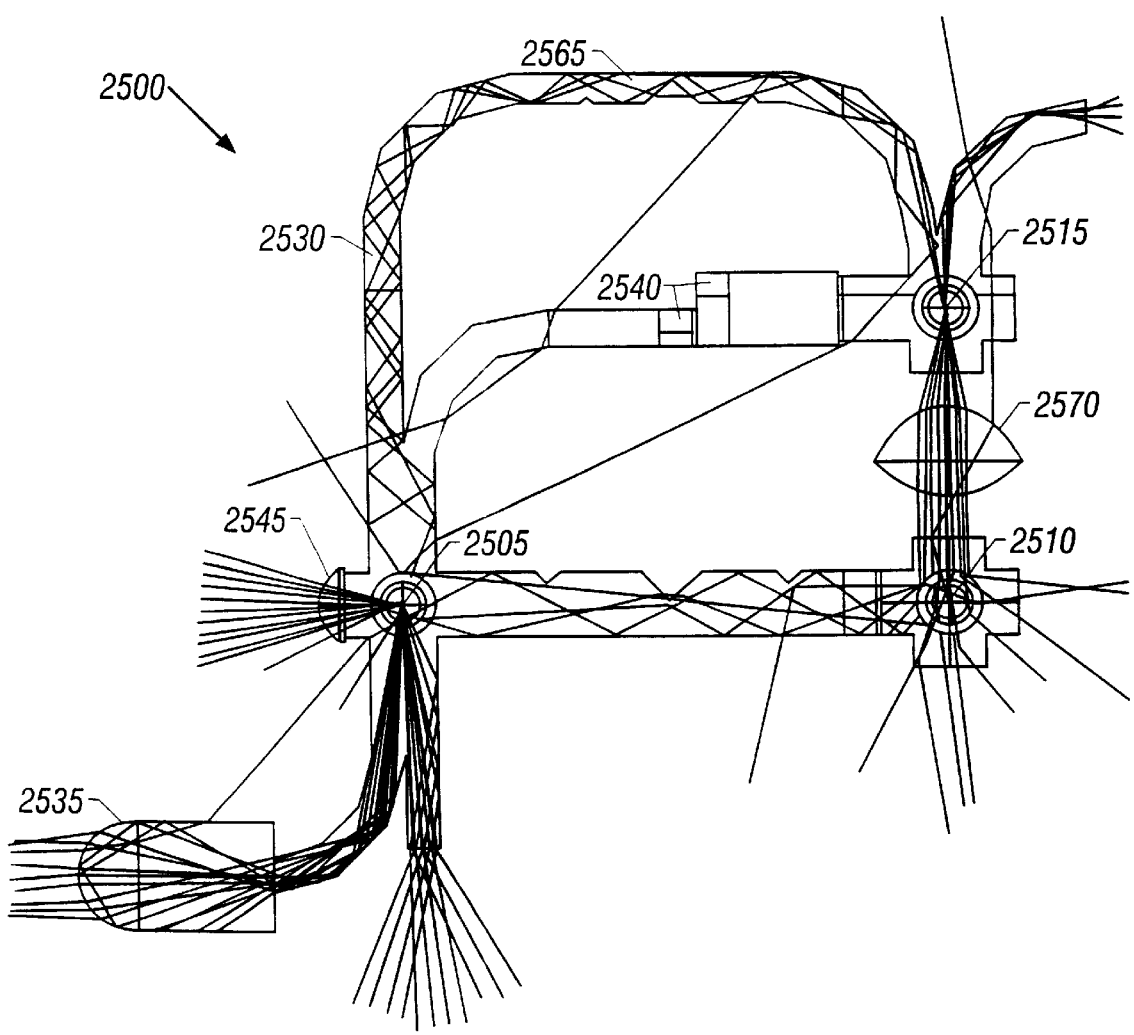
Figure 25D:
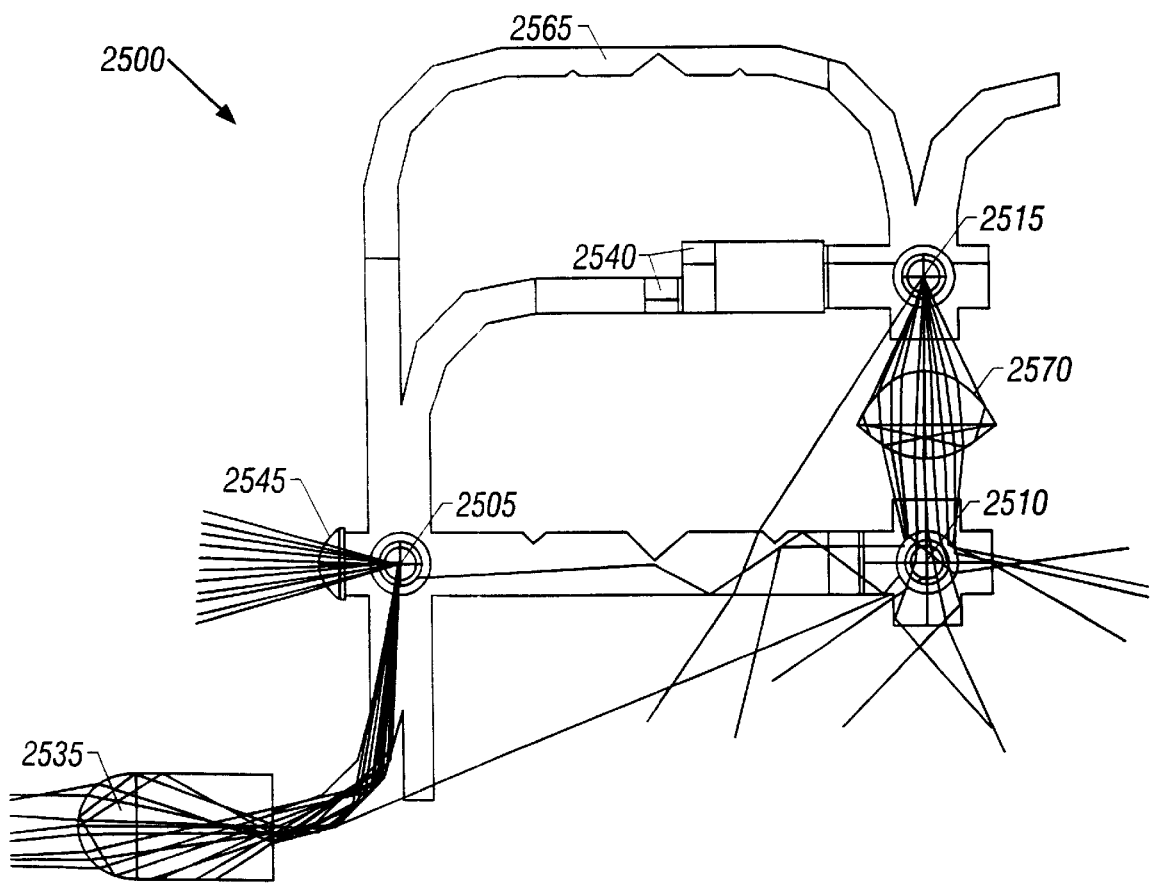
Figure 25E:
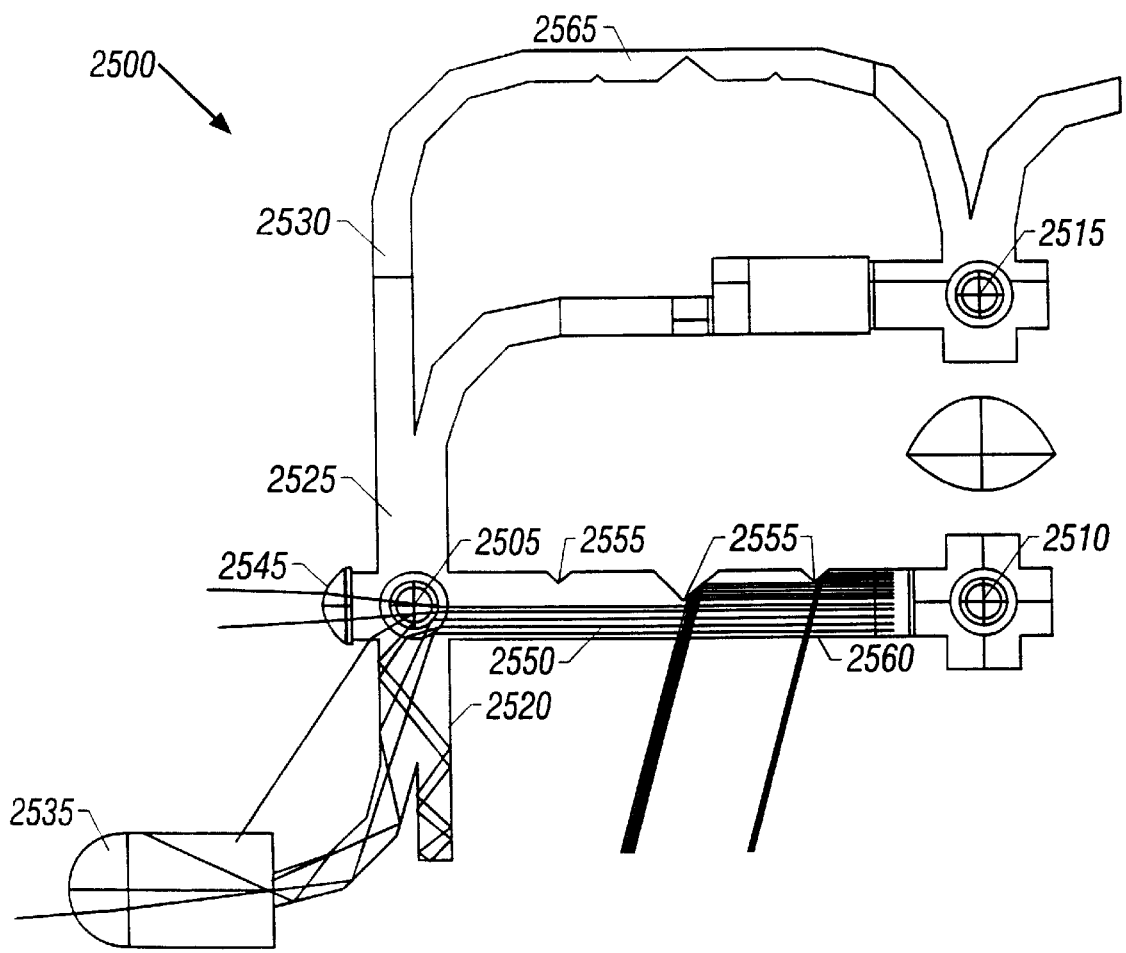

The fourth arm 2550 includes scattering notches 2555 to cause light to be transmitted from the side 2560 of the waveguide, as shown in FIG. 25E. Another waveguide 2565 in the system has similar scattering notches. The fourth arm 2550 terminates at a second light source 2510 that is positioned in a waveguide collar. The waveguide collar may be connected to the output arm with integrated snaps or attached with index-matched epoxy.

As shown in FIGS. 25C and 25D, a lens 2570 is positioned between the second 2510 and third 2515 sources. The lens 2570 focuses light output by the third source 2515 so that it can be received by the waveguide collar housing the second source 2510. The received light is distributed by the waveguide collar housing the second source. If the second light source 2510 were to fail, the components attached to the second light source 2510 would still receive light. Hence, the configuration provides light source redundancy. Alternatively, the second and third sources could be connected by a waveguide.

Other embodiments are within the scope of the following claims.

What is claimed is:

1. An optical waveguide structure for distributing light from a light source, the structure comprising:
   a cylindrical sleeve configured to accommodate and receive light from a light source, the sleeve defining a central longitudinal axis, and
   a waveguide collar formed from a solid, planar block of material, the block of material having:
     a central portion defining at least one edge and configured to accommodate and surround the sleeve, and
     a plurality of output arms extending in a plane outwardly from the central portion beyond the edge thereof, the plane being substantially perpendicular to the central longitudinal axis.

2. The optical waveguide structure of claim 1, wherein the sleeve is configured to confine a portion of light from the light source through internal reflection and to transmit the light away from the light source in the direction of the central longitudinal axis.

3. The optical waveguide structure of claim 1, wherein the sleeve is longer in the direction of the central axis than a thickness of the central portion in that direction.

4. The optical waveguide structure of claim 1, wherein the sleeve comprises rim portions, the rim portions positioned to define gaps, the gaps being configured to accommodate locking tabs of a lamp base.

5. The optical waveguide structure of claim 1, further comprising an integral lens portion formed at an end of the first arm.

6. A waveguide collar for distributing light from a light source, the collar comprising a solid, planar block of material, the block of material having:
   a central portion configured to accommodate a light source, the central portion surrounding the light source in a plane and defining at least one edge, and
   a plurality of output arms extending in the plane away from the central portion, and beyond the edge thereof, wherein a thickness of the central portion in a direction perpendicular to the plane is less than a thickness of the output arms in the direction perpendicular to the plane.

7. The waveguide collar of claim 6, further comprising a cylindrical sleeve configured to accommodate and receive light from a light source, the sleeve being positioned within the central portion.

8. A waveguide collar for distributing light from a light source, the collar comprising a solid, planar block of material, the block of material having:
   a hub defining an interior portion configured to accommodate a light source, the hub having side surfaces on an exterior portion thereof,
   alignment notches positioned on the side surfaces, the notches being configured to receive an alignment tab of a waveguide, and
   rim portions extending around the interior portion of the hub, the rim portions positioned to define gaps, the gaps being configured to accommodate locking tabs of a lamp base.

9. A waveguide collar for distributing light from a light source, the collar comprising a solid, planar block of material, the block of material having:
   a central portion configured to accommodate a light source, the central portion surrounding the light source in a plane,
   first and second output arms extending in a plane away from the central portion, the sides of the first and second output arms curving inward toward the central portion to form first and second vertices where the first and second arms meet, and
   a lens formed on an edge of the waveguide collar, the lens being configured to receive light from the light source, focus a portion of the light, and transmit the portion of the light away from the collar.

10. The waveguide collar of claim 9, further comprising a cylindrical sleeve configured to accommodate and receive light from a light source, the sleeve being positioned within the central portion.

* * * * *

UNITED STATES PATENT AND TRADEMARK OFFICE
CERTIFICATE OF CORRECTION

PATENT NO. : 6,238,074 B1  Page 1 of 1
APPLICATION NO. : 09/109051
DATED : May 29, 2001
INVENTOR(S) : George R. Hulse and James Burr Anderson, Jr.

It is certified that error appears in the above-identified patent and that said Letters Patent is hereby corrected as shown below:

Title Page (60)

Section entitled Related U.S. Application Data, before "Provisional" insert therein --This application is a Continuation-In-Part of Serial No. 09/009,836, filed on January 20, 1998 (PAT NO. 6,168,302) and claims the benefit of--.

On the Title Page (74)

Section entitled Attorney, Agent or Firm, delete "Keising" and insert therefor --Reising--.

Signed and Sealed this

Nineteenth Day of February, 2008

JON W. DUDAS
*Director of the United States Patent and Trademark Office*